United States Patent Office 3,804,741
Patented Apr. 16, 1974

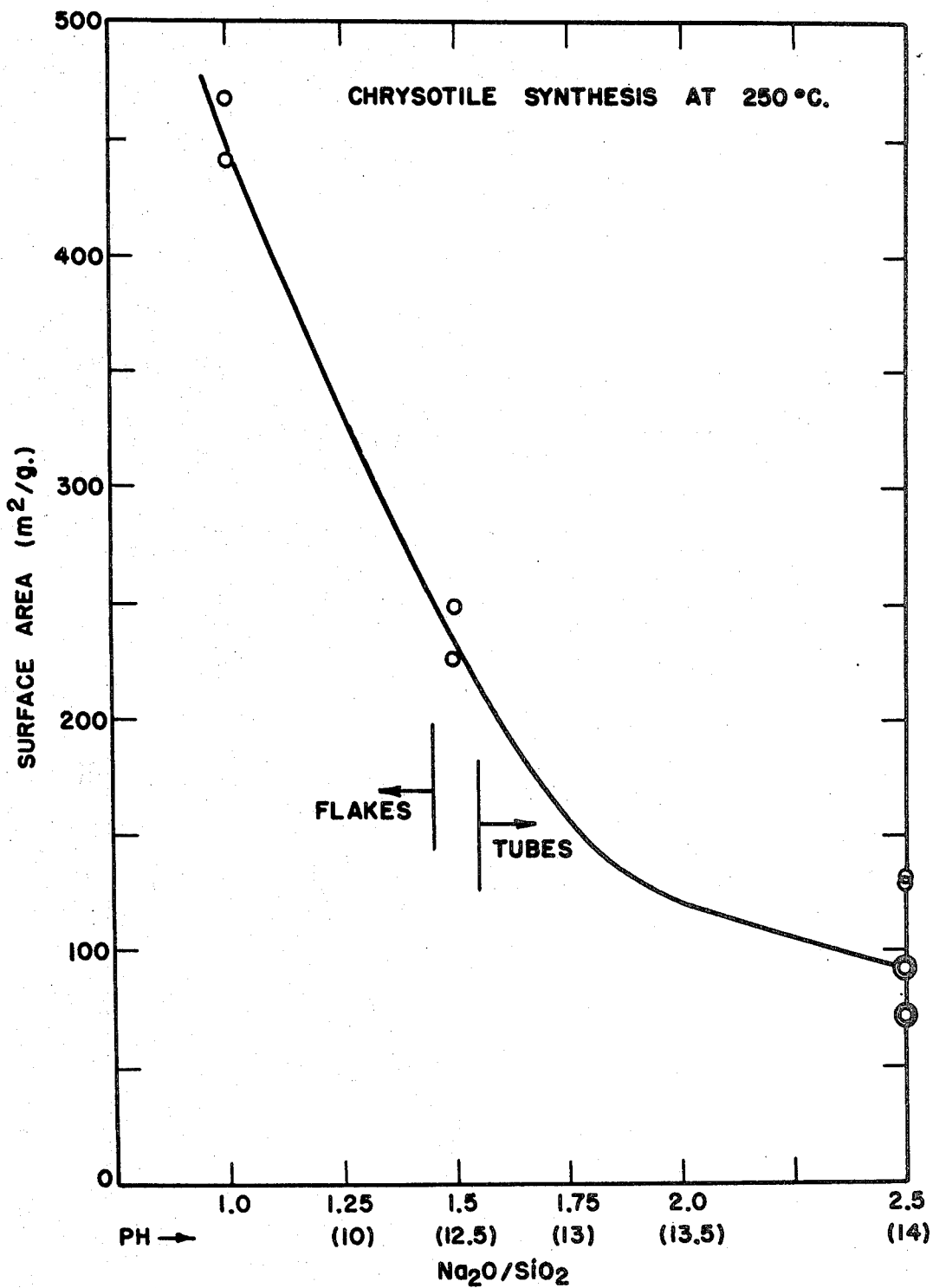

3,804,741
HYDROCARBON CONVERSION AND HYDROCRACKING WITH LAYERED COMPLEX METAL SILICATE AND CHRYSOTILE COMPOSITIONS
Harry E. Robson, Baton Rouge, La., assignor to Velsicol Chemical Corporation, Chicago, Ill.
Original application Aug. 31, 1970, Ser. No. 68,324, now Patent No. 3,729,429, dated April 24, 1973. Divided and this application Mar. 9, 1972, Ser. No. 233,368
Int. Cl. B01j *11/22;* C10g *11/00, 13/02*
U.S. Cl. 208—110                    86 Claims

ABSTRACT OF THE DISCLOSURE

A new and improved process for the preparation of layered complex metal silicates, especially chrysotiles, at low severity conditions. These crystalline forms of complex metal silicate, for shape ranging from thick wall tubes through thin wall tubes, and thin wall tubes through flakes, can be produced, with high surface area, as desired, in hydrated form, by contact of suitable silica and metal sources in a reaction or synthesis mixture at pH of at least about 10, and preferably from about 12 to 14, at moderate temperatures and pressures. The process can produce chrysotiles, some of which have been found to exist in nature, or heretofore synthetically produced, but can as well produce chrysotile species which differ chemically or physically, or both, from previously known species. New and novel forms of chrysotile are improved in many of their physical and chemical characteristics as contrasted with previous species, and are particularly useful directly or indirectly in conducting hydrocarbon conversion reactions.

---

This is a division of Ser. No. 68,324, filed Aug. 31, 1970 (now U.S. 3,729,429, issued Apr. 24, 1973); and is related to application Ser. No. 68,393, filed Aug. 31, 1970 (now U.S. 3,686,341, issued Aug. 22, 1972); Ser. No. 68,213, filed Aug. 31, 1970 (now U.S. 3,692,700); and Ser. No. 68,394, filed Aug. 31, 1970 (now U.S. 3,686,348).

Certain forms of layered complex metal silicates are formed of sheets of paired layers of $Si_2O_5$, or serpentine, fused together with layers of metal chemically combined with hydroxyl ions. Illustrative of such naturally occurring materials which have common morphological and structural characteristics are chrysotile, $Mg_3(OH)_4Si_2O_5$, garnierite, $Ni_3(OH)_4Si_2O_5$, metahalloysite,

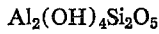

and kaolinite, $Al_2(OH)_4Si_2O_5$. Synthetic complex metal silicates of this character have been formed, these materials generally retaining their high stability while having a higher degree of dispersability, purity and homogeneity than those products found in nature. These synthetic materials, particularly the pure materials, are thus useful as filtering mediums, absorbents, fillers and the like. Because of their high stability to heat, they are also useful in the production of high temperature or flame resistant fabrics, and can be used in woven and nonwoven fabrics.

Asbestos is a naturally-occurring complex metal silicate of this character. The term, commonly used to identify a material of a fibrous textile nature capable of being woven into a fabric, is more specifically used to identify a variety of serpentines called chrysotile, ideally

supra, a species of layered complex metal silicate. Though the structure can differ in chemical composition to some extent due to the presence of impurities, this naturally-occurring material as other forms of chrysotile is a serpentine of type formed of sheets of paired layers of $Si_2O_5$ fused together with layers of metal, in this instance magnesium, chemically combined with hydroxyl ions. Investigations have been made of the properties of these forms of complex metal silicates, and it has been reported, e.g., that natural chrysotile has the configuration of hollow tubes or cylindrical fibrils with an average outer diameter of 200 to 250 A. (angstrom units) and an average inner diameter of 20 to 50 A. As reported in the "Encyclopedia of Chemical Technology," 2nd ed., vol. 2, p. 738 (Interscience Publishers), naturally-occurring chrysotiles typically have surface areas varying from 4 to 12 square meters per gram (m.²/g.) though by additional fibrilization the surface areas can be increased to 30 to 50 m.²/g. Noll et al. have reported [("Kolloid-Zeitschrift," vol. 157 [1], pp. 1 to 11)] that synthetic chrysotile,

can be prepared having areas ranging as high as 110 m.²/g. (BET Method). Noll et al. have also reported [Beitrage zur Mineralogie und Petrographie, vol. 7, 1960, pp. 232–241] synthetic nickel and cobalt substituted forms of chrysotile — viz., garnierite, $Ni_3(OH)_4Si_2O_5$, and $Co_3(OH)_4Si_2O_5$—with surface areas ranging as high as 125 m.²/g. and 190 m.²/g. (BET Method), respectively. Little has been reported in regard to other forms of chrysotile.

Chrysotiles have in the past been used as support materials, or carriers, for oxidation catalysts such as platinum supported on natural chrysotile for use in the conversion of sulfur dioxide to sulfur trioxide. Despite the apparent advantage offered by the extremely high thermal stability of this class of complex metal silicate, these materials, insofar as is known, have never been used except as catalyst supports. A reason for this, perhaps, is because, in their natural state, little if any catalytic activity is shown. Moreover, though purer and more catalytically interesting forms have been prepared synthetically over many years, these materials yet remain little more than a matter of academic interest. Perhaps this is due in part to the extreme difficulty of preparing even minute amounts of these materials for experimentation.

Until now, synthesis of layered complex metal silicates, highly preferred of which are the chrysotiles, has only been possible under hydrothermal conditions at relatively high temperatures and extreme pressures. Generally, temperatures on the order of 350° C. to 600° C., and higher, and pressures on the order of 13,000 p.s.i. (pounds per square inch absolute) to 23,000 p.s.i., and higher, have been employed to produce these materials. Such extreme conditions, of course, are not conducive to commercial or large-scale operations, and though the purity and quality of these materials over the natural products have been improved some advantages, the properties nonetheless did not appear of particular interest for use of these materials as catalysts. In large part, this is probably due to the relatively limited number of interesting specimens found in nature, the only major source of supply, to the low surface areas observed in the naturally-occurring forms of these materials, and to the only relatively modest gains made in synthesis even of the few of these materials which have been synthetically produced.

Nonetheless, it is the primary objective of the present invention to obviate these and other prior art difficulties.

A particular object is to provide a new and improved process for production of these layered complex metal silicates, or silicates formed of sheets of paired layers of $Si_2O_5$, or serpentine, fused together with layers of certain types of metal, or metals, chemically combined with hydroxyl ions.

A specific object is to provide such process which can be operated at low severity conditions, i.e., at temperatures and pressures considerably lower than heretofore possible, which process is capable of producing complex metal silicates resembling, or closely resembling, the chemical or physical composition, or both, of those found in nature as well as a spectrum of new and novel complex metal silicates which differ in chemical or physical composition, or both, from those found in nature.

Another object is to provide complex metal silicate and chrysotile compositions which differ in one or more of their chemical or physical characteristics, or both, from those compositions found in nature, or heretobefore synthetically produced.

A further object is to provide complex metal silicates and chrysotiles which differ in one or more of their chemical or physical characteristics, or both, for direct or indirect use as catalysts, or catalytic agents, for use in hydrocarbon conversion reactions.

In addition to the many known usages of the layered complex metal silicates, supra, and the advantages offered by synthesis of these materials with greater adsorption and absorption capacities, and in high purity state, the present compositions can be used directly or modified by known techniques for use in hydrocarbon conversion reactions for improving the octane number of gasoline or converting relatively heavy hydrocarbons to light, lower boiling hydrocarbons, and including converting hydrocarbons by hydrogenation or dehydrogenation to saturate or unsaturate, in whole or in part, various species of molecular hydrocarbons. Among such hydrocarbon conversion processes are aromatization, isomerization, hydroisomerization, cracking, hydrocracking, polymerization, alkylation, dealkylation, hydrogenation, dehydrogenation, desulfurization, denitrogenation, and reforming.

It has now been found that layered complex metal silicates, particularly chrysotiles, of shape ranging from very thick wall tubes (substantially rods in character) through moderately thick wall tubes, thick wall tubes through thin wall tubes, and thin wall tubes through flakes can be synthetically prepared from soluble forms of silica, and certain metals or their oxides and hydroxides in alkaline medium, in critical concentration, at moderate temperatures and pressures. The layered complex metal silicates, including chrysotiles, formed in accordance with the present inventive process, and certain of the high surface area compositions of the present invention, are of crystalline structure defined chemically by repeating units represented by the following structural formula:

(I) 

where M and $\overline{M}$ are selected from monovalent and multivalent metal cations, of valence ranging from 1 to 7, having an effective ionic radius [Goldschmidt radius, Effective Radii of Atoms and Ions From Crystal Structure, p. 108, Lange's Handbook of Chemistry, 10th ed., Handbook Publishers, Inc., Sandusky, Ohio] ranging from about 0.5 to about 1 A., and preferably from about 0.57 to about 0.91 A., $x$ is a number ranging from 0 to 1, this number expressing the atomic fraction of the metals M and $\overline{M}$, $a$ is the valence of M, $b$ is the valence of $\overline{M}$, $n$ is a number equal in value to that defined by the ratio $$6/[a(1-x)+bx]$$

and $w$ is a number ranging from 0 to 4. Some species of these complex metal silicates have been found to exist in nature, and some species have been synthetically produced. Some species differ chemically from those found in nature, or those heretofore synthetically produced, and others, though chemically similar, possess different physical properties.

Illustrative of this type of complex silicate, in any event, is the form of serpentine known as chrysotile, the dehydrated form of which has the idealized structural formula $Mg_3(OH)_4Si_2O_5$. The formula is idealized in the sense that chrysotiles, as other minerals, rarely, if ever, appear in nature in pure form but contain very small amounts of impurities such as iron, aluminum, and the like, substituted for magnesium, and occasionally for silicon. Chrysotile is a mineral derived from multiple layers of $Si_2O_5$, or serpentine, condensed with $Mg(OH)_2$, or brucite layers, this material existing in nature as cylindrical shaped rods or thick tubes. The naturally-occurring mineral antigorite is also illustrative of such complex silicate having the idealized formula $Mg_3(OH)_4Si_2O_5$. In nature, this material is also constituted of $Si_2O_5$, or serpentine, condensed with layers of $Mg(OH)_2$, or brucite. This material, however, is found in nature in the form of plates of undulating shape. Ortho serpentine, $Mg_3(OH)_4Si_2O_5$, a six-layer serpentine, is also found in nature, as is lizardite, $Mg_3(OH)_4Si_2O_5$, which is a one-layer serpentine. Both of these materials are found in the form of plates. Garnierite, a nickel substituted form of layered complex silicate, $Ni_3(OH)_4Si_2O_5$, is found in nature in the form of tubes. Synthetic garnierite has also been prepared by prior art workers, nickel having been substituted for magnesium in conventional synthetic chrysotile formulations. Cobalt chrysotile, $Co_3(OH)_4Si_2O_5$, has been prepared in similar manner. Insofar as known, however, attempts to prepare other useful forms of synthetic chrysotiles have failed.

The process of this invention can be employed not only to produce complex metal silicates of known chemical composition, but also complex metal silicates of new and novel chemical composition. It can also be used to produce both old and new chemical compositions with new, different, and unique physical properties, particularly as regards high surface area compositions.

Chrysotiles of known chemical composition are thus included in the foregoing Formula I, but even these compositions can be produced with entirely different physical properties, especially as regards surface areas. Essentially pure forms of chrysotile, defined in the foregoing formula as those species wherein $x$ does not exceed about 0.03 and preferably about 0.01, are thus magnesium chrysotile, $Mg_3(OH)_4Si_2O_5$, with surface areas of above about 110 m.$^2$/g., nickel chrysotile, $Ni_3(OH)_4Si_2O_5$, with surface areas above about 125 m.$^2$/g., and cobalt chrysotile, $Co_3(OH)_4Si_2O_5$, with surface areas above about 190 m.$^2$/g., the maximum surface areas achieved by prior art practice, can thus be produced pursuant to the practice of this invention. Other forms of chrysotile, included within the scope of this formula, can also be produced pursuant to this invention but with surface areas exceeding 110 m.$^2$/g., the maximum surface area heretofore achieved by prior practice (exclusive of the nickel and cobalt chrysotile species). Preferred forms of these high surface area species are those in the form of thin wall tubes of surface area ranging about 150 m.$^2$/g. to about 250 m.$^2$/g., preferably about 160 m.$^2$/g. to about 200 m.$^2$/g., and those in the form of thin flakes of surface area ranging from about 250 m.$^2$/g. to about 600 m.$^2$/g., and higher, preferably from about 250 m.$^2$/g. to about 450 m.$^2$/g.

Pursuant to the practice of the present process, compositions can be prepared which differ in their chemical structure from heretofore existing compositions in that they contain two or more metals in significant concentration within the crystalline structure, and include, particularly, such compositions of high surface areas. These new compositions are of crystalline structure defined by repeating units represented by the following structural formula:

(II) 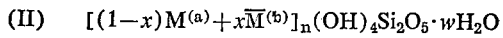

wherein M and $\overline{M}$ are metal cations having an effective ionic radius (Goldschmidt) ranging from about 0.5 to about 1 A., $a$ expresses the valence of M and is equal to 2, $b$ expresses the valence of $\overline{M}$ and is an integer ranging from 1 to 7, and preferably is an integer ranging from 2 to 4, $x$ is a number ranging from 0.01 to 0.50, preferably from 0.03 to 0.20, and $n$ is a number ranging from 2.5 to 3.3, and preferably from 2.7 to 3.0. $w$ is a number ranging from 0 to 4. Exemplary of such compounds are

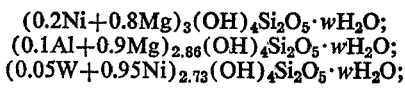

and

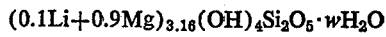

In these formulae, M and $\overline{M}$ can thus be the same or different metals, and these can be of the same or different valence. The complex metal silicates can thus contain essentially one metal, or can contain two or more different metals in varying concentrations. In Formula I M and $\overline{M}$ can be monovalent or multivalent metals of valence ranging from 1 to 7, while in Formula II M is a divalent metal. The valence of $\overline{M}$ can range from 1 to 7. $\overline{M}$ of the formulae can also represent more than one monovalent or multivalent metal, though substantially bimetallic compositions are generally preferred. The cationic form of the metal of the crystal must have an effective ionic radius substantially within the ranges described. Illustrative of metals utilized in acceptable cationic form, which can be selected from the Periodic Table of the Elements (E. H. Sargent & Company, copyright 1962 Dyna Slide Co.), are Group I-A metals such as lithium, Group I-B metals such as copper, Group II-A metals such as magnesium, Group II-B metals such as zinc, Group III-B metals such as scandium, Group III-A metals such as aluminum and gallium, Group IV-B metals such as titanium and zirconium, Group V-B metals such as vanadium, Group VI-B metals such as chromium, molybdenum and tungsten, Group VII-B metals such manganese and Group VIII metals such as iron, cobalt, nickel, palladium and platinum.

Preferred metals from these classes are magnesium, nickel, cobalt, chromium, molybdenum, tungsten, palladium, platinum and aluminum. Magnesium is preferred because of the relative ease of formation of the complex magnesium silicates which are useful as catalysts, and such silicates are quite useful as support materials. Pursuant to the process of this invention, other complex metal silicates are formed by substitution of other metal ions for the magnesium. Nickel and cobalt are also preferred metals with known catalytic properties, and can be readily substituted for magnesium, in whole or in part, to provide highly active hydrogenation components in formation of fuels processing catalysts. Chromium is found highly suitable for formation of other complex metal silicates of the type herein described, and can be used to produce aromatization catalysts of good quality for use in fuels processes. Molybdenum is found useful, especially for the production of hydrodesulfurization and reforming catalysts. Tungsten and palladium are useful for formation of hydrocracking catalysts. Platinum is useful in forming reforming catalysts and aluminum for use in the production of catalytic cracking catalysts. In general, the synthetic chrysotiles of this invention provide a means of maintaining a metal in dispersed form on a silica surface to provide greater activity, this being contrasted with the addition of metals to such preformed support materials which leaves something to be desired in maintaining this high state of dispersion.

Complex metal silicates of these types can be synthetically prepared in hydrated form in very high yields from solution or gels, and then converted to dehydrated form by subjection to heat, as desired. The complex metal silicates are prepared by reacting a metal cation source with a silica source in proportions approximating the stoichiometric complex metal silicate composition, in an alkaline medium of pH ranging from about 10, and higher, and preferably at pH ranging from about 12 to about 14, at moderate temperatures and pressures. Suitably, the reaction is conducted at temperatures ranging below 300° C., preferably at temperatures ranging from about 200° C. to about 275° C. Lower temperatures can be used but the reaction proceeds quite slowly. Pressure in many systems are suitably autogenous, i.e., maintained at the vapor pressure of the liquid solvent at the temperature of operation. This is especially true of aqueous mediums, these mediums being especially preferred. Pressures as high as 12,000 p.s.i., and higher, can be employed, but generally it is commercially unfeasible to operate at pressures above about 1000 p.s.i. Preferably, pressures ranging from about 200 p.s.i. to about 1000 p.s.i., and more preferably pressures ranging from about 400 p.s.i. to about 800 p.s.i. are maintained upon the reaction system. Reaction time ranges generally from about 0.5 to about 72 hours, and preferably from about 4 to about 24 hours.

The compositions of the present invention encompass: (a) layered complex metal silicates defined by Formula I where the surface area of the composition ranges above about 110 m.²/g., except as regards nickel chrysotile, $Ni_3(OH)_4Si_2O_5$, and cobalt crysotile, $Co_3(OH)_4Si_2O_5$, but encompasses these latter species wherein the surface areas range above about 125 m.²/g. and 190 m.²/g. (BET Method), respectively; and (b) layered complex metal silicates defined by Formula II, the higher surface area compositions being especially preferred. The most preferred compositions of the present invention, because they are admirably suitable for direct or indirect use as hydrocarbon conversion catalysts or catalyst supports, are the chrysotiles. For purposes of this invention, chrysotiles are those compositions defined in Formula I and Formula II wherein the $Si_2O_5$, or serpentine layers of the repeating unit which form the crystals, are of smaller length or diameter than the associated metal hydroxide layers to which the serpentine layers are adjoined. This characteristic structure is distinguishable from other layered complex metal silicates, and other crystalline substances, by X-ray diffraction patterns whether the crystal structures exist as tubes or flakes.

X-ray powder diffraction data for the two physically different forms of chrysotile are as given below.

X-RAY DIFFRACTION PATTERNS FOR CHRYSOTILE

| Tubes: | | Flakes: | |
| --- | --- | --- | --- |
| $d$ (A.)— | I | $d$ (A.)— | I |
| 7.50±.40 | s. | | |
| 4.50±.20 | m. | 4.55±.20 | m. |
| 3.67±.13 | s. | 3.22±.10 | w. |
| 2.58±.06 | m. | 2.59±.06 | m. |
| 2.46±.06 | m. | | |
| 2.10±.04 | w. | | |
| 1.725±.025 | w. | 1.73±.025 | w. |
| 1.525±.015 | m. | 1.54±.015 | m. |
| 1.320±.010 | w. | 1.31±.010 | w. |
| 1.300±.010 | w. | | |

In obtaining the X-ray powder diffraction pattern, standard procedures were employed. The radiation source was the K-alpha doublet for copper. A Geiger counter spectrometer with a strip chart pen recorder was used in recording the data. The peak heights I, and the positions as a function of 2θ, where θ is the Bragg angle, were read from the spectrometer chart. From these, the relative intensities I were observed. Also, the interplanar spacing, $d$, in angstrom units, corresponding to the recorded lines, were determined by reference to standard tables. In the above table, the more significant interplanar spacings, i.e., $d$ values, for chrysotile tubes and flakes, respectively, are given. The relative intensities of the lines are expressed as s. (strong), m. (medium) and w. (weak).

In chrysotile it is thus known that the mineral is formed of paired serpentine and brucite layers which do not match, and hence the crystal is strained. Consequently, this gives rise to different physical forms and shapes inasmuch as relief from the strain is gained by a curl of the crystal along its long axis so that chrysotile exists in nature as cylindrical shaped rods or thick wall tubes. The thick wall tubular structure has been observed in synthetic forms of chrysotile. In the present process, the complex metal silicates are also formed as thick wall tubes, thin wall tubes, curls or flakes, as desired, from gels as paired layers of different sizes. Layers of silicon-oxygen sheets are combined with layers of hydroxyl groups cemented to the silicon-oxygen sheets by metal cations. Each of the repeating units, considering for convenience the anhydrous form, is thus formed of a layer of sepentine, or $Si_2O_5$, and an adjacent larger sized layer of metal chemically combined with hydroxyl ions, or $$[(1-x)M^{(a)} + x\overline{M}^{(b)}]_n(OH)_4$$

to which the former is fused. The paired, fused metal-hydroxyl ions and serpentine layers are held together by very strong forces of attraction, while the repeating units of paired layers per se are held together by weaker forces of attraction. A serpentine or $Si_2O_5$ layer is formed of a sheet of linked $SiO_4$ tetrahedra, three oxygen atoms of each $SiO_4$ being shared with adjacent $SiO_4$ tetrahedra in the same layer. The vertices of all the tetrahedra point in the same direction, or outwardly for a rod or tube structure. In the metal-hydroxyl layer or $$[(1-x)M^{(a)} + x\overline{M}^{(b)}]_n(OH)_4$$

layer, one-third of the oxygen atoms are oxygen ions $[O^{-2}]$ which are shared with silica tetrahedra of the adjacent serpentine or $Si_2O_5$ layer. The remaining oxygen atoms are hydroxyl groups, and these are associated only with M or $\overline{M}$ cations. Thus, the M or $\overline{M}$ cations are surrounded by six ions, four hydroxyl groups, or ions, and two oxygen ions in a case where the metal is a divalent cation such as magnesium.

These forms of layered complex metal silicates can thus be logically considered as chrysotiles, or substituted chrysotiles, since they possess the chrysotile structure; and have been so characterized in the art in the forms known to exist—viz., as chrysotile, or magnesium chrysotile, $Mg_3(OH)_4Si_2O_5$, as nickel chrysotile, $Ni_3(OH)_4Si_2O_5$ and as cobalt chrysotile, $Co_3(OH)_4Si_2O_5$. Using the Pauling notation, a repeating unit of the crystalline structure comprising five tiers of ions (1 through 5) can be conveniently illustrated as follows:

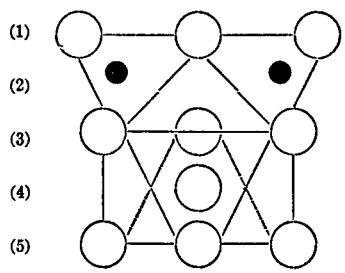

Tier 1 is constituted entirely of oxygen ions. Tier 2, constituting the tetrahedral cation position, is essentially constituted of silicon ions. Tier 3 is constituted of both oxygen and hydroxyl ions—viz., two oxygen ions and a hydroxyl ion. Tier 4, which constitutes the octahedral cation position, is constituted of a monovalent or multivalent meal cation M or $\overline{M}$. This is the primary cation site for substitution of the various metals represented by M and $\overline{M}$ into the chrysotile structure. Where only magnesium is contained in the octahedral cation position, the chemical structure is that of chrysotile; and where nickel or cobalt is wholly substituted for magnesium, the chemical structure is also that heretofore produced synthetically and known as nickel chrysotile (or garnierite) and cobalt chrysotile. Tier 5 is constituted entirely of hydroxyl ions. The serpentine or $Si_2O_5$ layer is constituted of those tiers of ions ranging from 1 through 3, and the metal-hydroxyl ion layer is constituted of those tiers of ions ranging from 3 through 5. Two of the ions of tier 3 are shared between the serpentine layer and the metal-hydroxyl ion layer, while the third ion is more identifiable with the metal-hydroxyl ion layer. In the repeating unit tier 1 contains 3 oxygen atoms, tier 2 contains 2 silicon atoms, tier 3 contains 2 oxygen atoms and 1 hydroxyl ion, tier 4 contains 3 magnesium ions and tier 5 contains 3 hydroxyl ions. While it is not apparent from accepted Pauling notation, the two layers are not of the same dimension, the metal-hydroxyl ion layer being of greater length than the serpentine layer so that there is a misfit of the two layers, and hence a strain between the paired layers which form a repeating unit.

The metal-hydroxyl ion layer of a repeating unit is of greater area (and length at least in one dimension) than an adjoining serpentine layer, the misfit between the two layers producing a stress-strain relationship which causes the layers to curve in a direction such that the concave side of the metal-hydroxyl ion layer adjoins the convex side of the serpentine layer. When the chrysotile is in tubular shape, this means that the structure is of coil shape, or formed of a series of concentric-like paired layers of the repeating units and the serpentine layer is the smaller diameter member of the paired layers.

The misfit between the paired layers in conjunction with the pH of the reaction medium at the time the crystals are formed is believed to give rise, at least in part, to the present inventive process. Pursuant to the practice of the present inventive process, in any event, it has been found that definite relationship exists between the pH of the alkaline medium and the nature and physical form of the crystalline materials which are formed, as well as with respect to the temperature and pressure at which the reactions can be conducted. By conducting the reactions at a pH of above about 10, and preferably at from about 12 to 14, it has been found that the reactions can be conducted at considerably lower temperatures and pressures than heretofore believed possible. This not only makes large scale commercial operation feasible but, additionally, provides a means of product quality control. It has thus been found that pH can be used to provide complex metal silicates of the types described in physical forms and shapes ranging generally from cylindrical shaped rods through thick wall tubes, from thick wall tubes through thin wall tubes, and from thin wall tubes through flakes. On the one hand, where the chemical species is known to exist, some of the physical forms are found in nature, or have heretofore been synthetically produced. Others differ physically from the natural forms, or forms heretofore synthetically produced. On the other hand, some of these materials are chemically as well as physically different forms. For example, chrysotile, $Mg_3(OH)_4Si_2O_5$, is found in nature in the form of rods and thick wall tubes of low surface area. This material has also been heretofore produced synthetically as thick wall tubes with maximum surface area of 110 m.$^2$/g. Thin wall tubes of higher surface areas are unknown. Other minerals having the same chemical structure as chrysotile are known to exist in nature, e.g., antigorite. It exists in nature as platelets of undulating shape, and generally possesses a very low surface area. Garnierite, $Ni_3(OH)_4Si_2O_5$, and a cobalt form of chrysotile, $Co_3(OH)_4Si_2O_5$, have been synthetically produced, but as specimens of surface area ranging as high as 125 m.$^2$/g. and 190 m.$^2$/g., respectively.

A feature of this process is that by judicious selection of pH, surface areas can be improved considerably, generally at least two-fold and ranging as high as almost ten-fold over the corresponding natural products where they exist. The surface areas of these materials can thus be controlled within conventional ranges, i.e., in the case of magnesium chrysotile up to about 110 m.$^2$/g., or can be increased above 110 m.$^2$/g. Preferably, tubes can be formed which have surface areas within the range of from about 150 m.$^2$/g. to about 250 m.$^2$/g., and higher, and more preferably within the range of from about 160 m.$^2$/g. to about 200 m.$^2$/g. (B.E.T. method; absorption of $N_2$ at its normal boiling point). Preferably, flakes can be formed with surface areas ranging from about 250 m.²/g. to about 600 m.²/g., and more preferably from about 250 m.²/g. to about 450 m.²/g. The nickel form of chrysotile, $Ni_3(OH)_4Sl_2O_5$, and the cobalt form of chrysotile, $$Co_3(OH)_4Sl_2O_5$$

in the form of tubes and flakes, can be produced with surface areas greater than 125 m.²/g. and 190 m.²/g., respectively, and preferably within the higher range of limits described. It is found that at different pH levels the character of the crystals can be controlled so that a given chemical specimen can be formed in the shape of rods, thick wall tubes, curls, or thin flakes and that surface areas can be controlled during the transition, surface area increasing as pH is lowered to favor, directionally, the production of rods through thick wall tubes, thick wall tubes through thin wall tubes, and thin wall tubes through flakes.

In general, in the formation of a species or chrysotiles at controlled conditions, as pH is lowered the tube walls get thinner, and the thin wall tubes generally yield surface areas no greater than about 200 m.²/g. to about 250 m.²/g. As pH is further lowered to obtain higher surface areas, the thin wall tubes form curls (or mal-formed tubes), and then break apart and form higher surface area flakes, the walls of which, directionally, also become thinner as pH is lowered. Thus, at constant temperature and pressure, specimens of definite character are formed at a selected pH. The actual transition points vary to some extent dependent largely upon the nature of the metal, or metals, used in formation of the complex metal silicate. The thickness of the walls of the tubes can thus be directly controlled by the selected pH. Thin wall tubes of only a few paired layers, e.g., 4 to 8 in thickness, can be formed. Such tubes ranging from about 20 A. to about 70 A., and preferably from about 28 A. to about 45 A., in thickness provide tubes of far greater inside diameter than occurs in the corresponding natural products, providing far greater adsorption space and accessibility for catalytic contact by reactant materials upon catalytic surfaces. For example, in sharp contrast to naturally-occurring magnesium chrysotile which exists in a cylindrical or rod-like form or in a thick wall tubular form having an inner diameter ranging from about 20 A. to 50 A., high surface area chrysotile compositions of this invention exist as tubes having inner diameters above 50 A., preferably from about 60 A. to about 100 A., and higher. The accessibility and high concentration of large pore openings which exist in these materials are quite important in considering the availability of surface areas for catalytic purposes. At surface areas above about 250 m.²/g. the chrysotile compositions of this invention are usually formed as relatively thin flakes. The thin flakes, because of their ultra-high surface areas, are the most preferred compositions for use in most hydrocarbon conversion reactions.

As suggested, as the pH is further decreased, at the selected conditions, the tubes begin to curl and then break apart to form thin flakes of very high surface area. The flakes range in thickness from about 15 to 50 A., and preferably from about 20 to 30 A.

It is feasible, at these low severity process conditions, to synthesize new and novel complex metal silicates from solutions containing reactive silicates, and reactive forms of the desired metal, e.g., soluble salts, or oxides and hydroxides. The reactants are combined in alkaline medium at moderate temperature and pressure. The complex metal silicates are formed in two steps. In a first step, a synthesis gel is formed by coprecipitation of the metal oxides or hydroxides with hydrous silica gel in alkaline medium. In a second step, the gel is heated at from about 200° C. to about 350° C., and preferably from about 250° C., to about 275° C., so that the chrysotile product is crystallized from the synthesis gel with rejection of excess water and soluble salts which are removed by filtration and washing. At the time of formation of the synthesis gel, the composition of the metal hydroxide layer of the crystal is fixed by selecting the concentration of metals to vary the ratios of M/$\overline{M}$, as desired. The structures are useful as catalysts, or can be further modified after initial formation, as desired, by cation exchange, as with ammonia and selected metal cations, or by impregnation with metal anions or cations, or both, or by a combination of ion exchange and impregnation.

The process improvements whereby previously existing or naturally-occurring complex metal silicates, as well as new and novel forms of complex metal silicates, can be made is effected by the use of highly alkaline mediums, of critical pH. High alkalinity causes the reaction to proceed at substantially milder conditions than heretofore believed possible. This favorable effect, which makes it generally unnecessary to conduct the reactions at the higher conventional temperatures and pressures, is not completely understood. The highly alkaline medium is employed to cause breakage of the silicon oxygen bonds, or depolymerization of the $SiO_2$ components, so that the latter becomes more freely migratory within the solution or gel even at relatively low temperatures and pressures. In any event, it is found that alkali concentration can be varied, as desired, in the reaction system to provide a variety of complex metal silicates, some resembling products heretofore found in nature or produced by other synthesis techniques, either in their chemical or physical characteristics, or both, and many products heretofore unknown as regards either their chemical or physical characteristics, or both.

The nature of the reaction by virtue of which pH can be used to control the physical forms of the chrysotiles produced is thus not entirely understood, but it would appear that the strain produced by the misfit of the unequal sized serpentine, $Si_2O_5$, and the larger metal-hydroxyl ion layers is in part responsible for this phenomenon. Thus, at the selected low severity conditions, the strain is greatest on the layers farthest away from the equilibrium diameter. At a given intermediate pH, crystals assume the form of thin wall multilayer structures of only a few layers thickness. These crystals are of high surface area and possess relatively large internal openings. At higher pH, the walls are thick, or the structure is even rod-like. At lower pH, the strain between the paired layers causes the tube to break apart to form high surface area, thin flakes. The use, or substitution, of metal cations of different size into the octahedral cation position, which is believed to be the primary cation site for substitutions, thus further alters the stress-strain relationship between the forming crystals. Hence, it would not be expected that a single set of parameters could be used to define the transition points, or zones, for the crystals of all of the different metals which can be substituted at the primary cation sites. It is found generally, however, that cations which most closely approach in size the effective ionic radius of magnesium are most readily substituted, and in highest concentration. It also appears that the size of the larger metal hydroxide layer of a crystal structure is directly related to the size of the cation substituted for magnesium and hence the stress-strain relationship altered so as to effect the curvature of the structure caused by the misfit between the larger metal hydroxide layer and the adjacent smaller serpentine layer. Whatever the explanation, however, the technique is admirably suitable for producing whole new families of high surface area crystals, and even families of crystals chemically different from those found in nature, or those heretofore synthetically produced.

Various alkaline materials can be used in the practice of this invention, providing they possess sufficient alkalinity to raise the reaction medium to the necessary pH, do not react to a significant extent with the forming complex metal silicates, with the intermediate materials, precipitate the silica, or decompose to gaseous products. Most preferred of these alkaline materials, for these reasons, are the alkali metal and alkaline earth metal hydroxides, exemplary of which are Group I–A metal hydroxides such as sodium hydroxide, potassium hydroxide, cesium hydroxide and the like, and Group II–A metal hydroxides such as barium hydroxide, strontium hydroxide and the like. A satisfactory Group III–A metal hydroxide is thallium hydroxide. Various other materials such as tetra alkyl ammonium hydroxides, e.g., tetra methyl ammonium hydroxide, can be employed.

Various sources of silica can be employed in the present process, these including essentially any of the conventional, widely used silica sources such as silica per se, diatomaceous earths, silica hydrogel, silica hydrosol, alkali metal silicates, e.g., sodium silicate, and the like. Particularly preferred sources of silicates are silica sol, silica gel, and sodium silicate olution (water glass).

Virtually any form of compound which is sufficiently soluble and compatible with the reaction mixture, which contains the desired metal, can be used as a source of the metal. Soluble salts of the metals, or mixtures of such salts, e.g., halides, sulfides, sulfates, nitrates, carbonates, acetates, phosphates, or the like, can be used to supply the desired metal, or metals, in formation of the complex metal silicates. Exemplary of such salts are lithium chloride, lithium bromide, cupric chloride, cupric sulfate, magnesium chloride, magnesium bromide, magnesium sulfate, magnesium sulfide, zinc acetate, zinc chloride, zinc bromide, scandium bromide, scandium sulfate, aluminum chloride, aluminum bromide, aluminum acetate, aluminum nitrate, aluminum phosphate, aluminum sulfate, gallium nitrate, gallium sulfate, titanium bromide, titanium trichloride, titanium tetrachloride, titanium oxydichloride, zirconium dibromide, zirconium sulfate, zirconyl bromide, vanadium bromide, vanadium trichloride, vanadyl sulfate, chromic acetate, chromic chloride, chromic nitrate, chromic sulfate, molybdenum oxydibromide, tungsten trisulfide, manganous sulfate, ferric chloride, ferrous chloride, ferrous sulfate, cobaltous nitrate, cobaltous sulfate, nickel chloride, nickel bromide, palladium chloride, palladium sulfate, platinic tetrachloride, and the like. Many hydroxides, oxides, or oxygenated anions of these various metals can also be employed, and these are particularly useful where it is desirable to increase the pH of the solution over and above that practical by a relatively weak base. Illustrative of such compounds are magnesium hydroxide, magnesium oxide, sodium tungstate, sodium molybdate, sodium chromate, sodium vanadate and the like. Other metal sources can also be employed, e.g., chloroplatinic acid, chloropalladous acid and the like.

The relative amounts of the silica and metal sources are most easily determined by the stoichiometry of the desired product, though the use of exact stoichiometric amounts of these materials in a given reaction mixture is unnecessary. Typically, the sources of silica and metal are used in quantities sufficient to provide a reaction mixture having a metal, or mixture of metals (calculated as the oxide or oxides), relative to the silica (calculated as the oxide) in mole ratio ranging from about 1 to about 2, and preferably from about 1.4 to about 1.6.

The invention will be more fully understood by reference to the following data, selected to demonstrate the more salient features of the novel process for preparation of these complex metal silicates, new and novel compositions, and the process of their use in various hydrocarbon conversion reactions.

A first series of runs are presented to demonstrate the manner in which pH can be used to control the production of the complex metal silicates. Chrysotile,

$$Mg_3(OH)_4Si_2O_5$$

is first selected to illustrate complex metal silicates of chemical type which, though found in nature and heretofore synthetically produced, can be nonetheless produced in new, different, and unique physical forms.

EXAMPLES 1–11

In each of the runs tabulated in Table I, the silica source comprises either colloidal silica sol, 150 A. particle size, sold under the Du Pont trade name as "Ludox LS–30," or sodium metasilicate. The silica source is added to an aqueous solution of a suitable magnesium source, i.e., a magnesium salt, in concentration of 50 parts by weight of the salt in 100 parts by weight of water. In order to produce the desired pH, to a solution or gel is then added various amounts of an alkali metal hydroxide, from a solution made up of 60 parts by weight of the alkali metal hydroxide per 100 parts by weight of water, with stirring for about 5 minutes at 25° C. and atmospheric pressure. Typically, as is demonstrated, the silica and magnesium sources are used in quantities sufficient to provide a reaction mixture having a $MgO/SiO_2$ mole ratio ranging from about 1.0 to about 2.0, but preferably of about 1.5. The pH of the solution ranges from 10 to 14, as determined by the amount of alkali metal hydroxide added.

The resultant mixtures are placed, in separate series of runs, in an autoclave heated at 250° C. at pressure of 570 p.s.i. After a period of 24 hours, the resultant insoluble products obtained in high yield, substantially stoichiometric, are cooled, filtered, washed with ten volumes of water to produce low sodium chloride levels, and dried at 120° C. in an oven. All specimens are positively identified by X-ray diffraction data as chrysotile.

TABLE I.—SYNTHESIS OF CHRYSOTILE

| Example | Reaction mixture compositions | | | | | Surface area, m.²/g.[1] | Physical form of compositions |
|---|---|---|---|---|---|---|---|
| | Silica source | Mg source | MgO/SiO₂ | Na₂O/SiO₂ | H₂O/SiO₂ | | |
| 1 | LS–30[2] | MgCl₂ | 1.5 | 2.5 | | 42 | 72 | Tubes. |
| 2 | LS–30 | MgSO₄ | 1.5 | 2.5 | | 64 | 92 | Do. |
| 3 | LS–30 | MgCl₂ | 2 | 2.5 | | 44 | 73 | Do. |
| 4 | LS–30 | MgCl₂ | 1.5 | 1.5 | | 42 | 249 | Do. |
| 5 | Metasilicate | MgCl₂ | 1.5 | 2.5 | | 65 | 93 | Do. |
| 6[3] | LS–30 | MgCl₂ | 1.5 | 2.5 | | 44 | 129 | Do. |
| 7[4] | LS–30 | MgCl₂ | 1.5 | 2.5 | | 44 | 132 | Do. |
| 8 | LS–30 | MgCl₂ | 1.5 | 1.5 | | 42 | 228 | Do. |
| 9 | LS–30 | MgCl₂ | 1.5 | 1.0 | | 51 | 468 | Flakes. |
| 10[5] | LS–30 | MgCl₂ | 1.5 | 1.0 (K₂O/SiO₂) | | 51 | 444 | Do. |
| 11[5] | LS–30 | MgCl₂ | 1.5 | 1.5 (K₂O/SiO₂) | | 51 | 467 | Do. |

[1] Surface area, and all surface areas reported and claimed herein, determined by BET Method: N₂ adsoprtion at its normal boiling point. Shell Development Company, "Simplified Method for the Rapid Determination of Surface Area by Nitrogen Adsorption," Report No. S–9815R, May 3, 1945.
[2] Colloidal silica sol (150 A.) particle size sold under the trade name "Ludox LS–30."
[3] Reaction temperature of 275° C.
[4] Reaction at 275° C. for 48 hours.
[5] KOH used as the alkali metal hydroxide.

A definite relationship is thus found to exist between the pH, or caustic mole ratio, and the surface area of the chrysotile produced. These results, graphically shown by reference to the attached figure, show that exceptionally high chrysotile surface areas are produced when alkali metal hydroxide is used in limited quantity to produce a reaction mixture having an alkali metal oxide-to-silica mole ratio below 1.75, this corresponding to a pH of about 13.

Referring further to the figure, it is found that long tubular shaped crystals with thick walls, openings of relatively small diameter, and low surface area are produced at $Na_2O/SiO_2$ ratios ranging from about 2.5 to about 2.0. The wall thickness of such crystals thus ranges from about 100 to about 50 A., the internal diameter of the openings from about 30 to about 60 A., and the surface area from about 70 to about 120 m.$^2$/g. At $Na_2O/SiO_2$ ratios between about 2.0 and 1.5, thin wall tubes with internal openings of relatively large diameters and high surface areas are formed. The wall thicknesses of these types of tubes thus range from about 50 to about 30 A., the internal diameter of the tubes from about 60 to about 150 A., and the surface area from about 120 to about 250 m.$^2$/g. Within the range of $Na_2O/SiO_2$ ratios beginning at about 1.5, the thin wall tubes apparently break down to form porous flakes. Thus, at $Na_2O/SiO_2$ ratios ranging about 1.5 and lower, thin flakes are formed. Such flakes range in thickness from about 30 to about 20 A., and have surface areas which range from about 250 to about 600 m.$^2$/g., and higher.

These data show that pH can be controlled to ameliorate process conditions, as well as to optimize the quality of the products. The process also makes it feasible to produce complex mixed metal silicates, as demonstrated by the following selected data.

EXAMPLE 12

A cobalt substituted chrysotile is prepared in the following manner: 50 parts by weight of Ludox LS-30 (described above) is added with stirring to a solution containing 9 parts by weight of $CoCl_2 \cdot 6H_2O$, 68.6 parts by weight of $MgCl_2 \cdot 6H_2O$ and 150 parts by weight of water. A solution consisting of 30 parts by weight of NaOH and 50 parts by weight of water is then added to the aforedescribed mixture and stirred at 25° C. and atmospheric pressure for about 5 minutes. The resulting mixture is then placed in an autoclave and heated to 250° C. for about 24 hours. The product is then cooled, washed and dried using the procedure given with reference to the foregoing examples. The product recovered, which is in the physical form of tubes, is a substituted chrysotile (identified by X-ray diffraction) having about 10% of the magnesium cations replaced with cobalt cations and having a surface area of about 267 m.$^2$/g.

EXAMPLES 13–21

The following series of data, given in Table II, is illustrative of additional runs for the preparation of substituted mixed-metal forms of chrysotiles. All specimens are positively identified by X-ray diffraction data as chrysotile.

example, Nesterchuk et al. ("Zap Uses Mineralog Obshchestria 95" [1], 75–9 [1966] and Roy et al. ("American Mineralogist 39," 957, 975 [1954] have reported the synthesis of chrysotile at temperatures ranging from about 350° to 600° C., at conventional hydrothermal conditions requiring a pressure ranging from about 13,000 p.s.i. to about 23,000 p.s.i. In contrast, production of chrysotile at 250° C., as described in the foregoing Example 12, requires pressures of only about 570 p.s.i. (vapor pressure of water at 250° C.), and will readily permit the large-scale manufacture of such chrysotiles.

AROMATIZATION

Certain of the complex metal silicates can be used per se as catalysts, or can be composited with various materials to form catalysts useful in aromatization of olefinic hydrocarbons, whether straight chain or branched chain, monoolefinic or polyolefinic and whether conjugated or unconjugated. For example, straight chain olefins can be converted to aromatic compounds, e.g., as in the conversion of hexene-1 and heptene-1 to benzene and toluene, respectively. While such process can be used for the conversion of olefins to aromatics for chemical uses, it is particularly important in petroleum fuels processing. This is so in that olefins have many undesirable properties in motor gasoline and can be converted to aromatics with higher octane number to produce superior gasoline, while simultaneously eliminating materials which contribute to gum formation and air pollution. In accordance with the present invention, however, higher octane number products can be obtained and substantial portions of the olefinic content of feeds converted into desirable aromatics, without significant conversion to lighter hydrocarbons.

Olefinic hydrocarbons containing from about 6 to about 12 carbon atoms are preferred, and these are aromatized according to the present invention by contacting a suitable feedstock with the catalyst at low pressures ranging, i.e., from about atmospheric to about 150 p.s.i., and preferably at from about atmospheric pressure to about 75 p.s.i. An inert gas, e.g., nitrogen, helium, methane, or the like, or hydrogen can be employed. Use of an inert gas offers certain advantages inasmuch as their use forces the reaction to proceed to completion whereas hydrogen is a product of aromatization. However, in certain cases, catalyst deactivation may occur and use of a moderate hydrogen pressure is quite beneficial to prevent catalyst activity decline. Temperatures ranging from about 300° C. to about 800° C., and preferably from about 450° C. to about 600° C., are used. High conversion of olefinic hydrocarbons with good selectivity to aromatics are obtained.

In preparation of preferred types of aromatization catalysts a transition metal, or mixture of such metals, is generally composited with a suitable base, as by impregnation of the base or crystallization of the base with a suitable metal hydroxide. The preferred transition metals which are dispersed upon a suitable base are Group VIII metals, illustrative of which is platinum, iridium, palladium, rhodium and including iron, cobalt and nickel. Group I-B metals, preferably as their oxide, such as copper, silver

TABLE II.—SUBSTITUTED CHRYSOTILES

| | | Reaction mixture composition [1] | | | | | Reaction conditions, hours at 250° C. | Surface area, M.$^2$/g. | Physical form of compositions |
|---|---|---|---|---|---|---|---|---|---|
| Ex. | Percent of Mg replaced with metal cation | Metal cation source | Mg source | Total metal cation/ $SiO_2$ | $Na_2O/ SiO_2$ | $H_2O/ SiO_2$ | | | |
| 13 | 20% Ni | $NiSO_4$ | $MgSO_4$ | 1.5 | 1.5 | 58 | 16 | 260 | Curls and flakes. |
| 14 | 100% Ni (garnierite) | $NiSO_4$ | | 1.5 | 1.25 | 58 | 24 | 338 | Flakes. |
| 15 | 20% Co | $CoCl_2 \cdot 6H_2O$ | $MgCl_2$ | 1.5 | 2.5 | 52 | 24 | 122 | Tubes. |
| 16 | 10% Co | $CoCl_2 \cdot 6H_2O$ | $MgCl_2$ | 1.5 | 1.25 | 63 | 24 | 403 | Flakes. |
| 17 | 10% Fe | $FeCl_2 \cdot 6H_2O$ | $MgCl_2$ | 1.5 | 1.5 | 52 | 24 | 398 | Do. |
| 18 | 10% Mn | $MnCl_2 \cdot 4H_2O$ | $MgCl_2$ | 1.5 | 2.5 | 52 | 66 | 88 | Tubes. |
| 19 | 10% Cu | $CuCl_2 \cdot 2H_2O$ | $MgCl_2$ | 1.5 | 1.5 | 47 | 24 | 311 | Flakes. |
| 20 | 10% Cr | $CrCl_3 \cdot 6H_2O$ | $MgCl_2$ | 1.5 | 2.5 | 52 | 65 | 356 | Do. |
| 21 | 10% Zn | $ZnCl_2$ | $MgCl_2$ | 1.5 | 2.5 | 47 | 24 | 166 | Tubes. |

[1] Molar basis.

The present low severity process makes it quite feasible to produce conventional materials, or entirely new materials—viz, materials which are different chemically or physically, or both—of wide variety suitable as supports or catalysts, or both, on a scale heretofore unknown. The production of chrysotiles is thus now possible at temperatures significantly below those employed heretofore. For and gold, can also be composited with the Group VIII metals. Other metals, preferably in the form of their oxides, can be impregnated or otherwise composited, either alone or in combination with the Group VIII metals as, e.g., Group VI-B metal oxides such as chromium, molybdenum and tungsten. Preferred complex metal silicate bases are those chrysotiles formed in whole or in part of magnesium or aluminum, or both. Illustrative of such bases are thin wall tubes and flakes of $$Mg_3(OH)_4Si_2O_5.$$

Preferably, the surface area of the tubular shapes range from about 110 m.$^2$/g. to about 250 m.$^2$/g., and flakes range preferably from about 250 m.$^2$/g. to about 500 m.$^2$/g. and higher. Preferred materials of these types also are chrysotiles containing from about 2 to about 10 weight percent aluminum, and a corresponding amount of magnesium as described by Formula II.

Preferred chrysotiles useful per se as aromatization catalysts are those high surface area forms of thin wall tubes and flakes containing, besides magnesium, about 0.1 to 1 weight percent platinum, or from about 1 to 15 weight percent chromium oxide ($Cr_2O_3$), or from about 1 to 15 weight percent molybdenum oxide ($MoO_3$), or from about 1 to 15 weight percent tungsten, as the oxide.

EXAMPLES 22–23

To illustrate useful catalysts for aromatization, a series of selected data are set out below. In one instance, chromia is composited with magnesium chrysotile and, in another, platinum is composited with magnesium chrysotile to form aromatization catalysts. The chrysotile employed in each instance consists of flakes of 356 m.$^2$/g., positively identified by X-ray diffraction data.

The chromia-magnesium chrysotile catalyst is prepared by dissolving chromium oxide in water to form an aqueous solution, and then adding same to the powdered magnesium chrysotile in amount sufficient to form paste. The wetted powder is stirred to form a paste, the paste containing 15 weight percent chromium oxide on magnesium chrysotile. The paste is then heated in an oven at 150° C. for 16 hours. The dry mass is then taken from the oven and crushed to a powder, and then calcined in air at 538° C. for 16 hours.

A portion of the catalyst composite is placed, as a fixed bed, in an upflow reactor and contacted at reaction conditions, as specified below, with a 50–95° C. cut of catalytic naphtha feed.

Feed composition, process conditions and the composition of the effluent are tabulated below.

TABLE III

Process conditions:
Temperature, ° C.—510
Pressure, p.s.i.g.—10
Gas—$N_2$
V./v./hr.—1

| | Feed composition, wt. percent | Liquid product composition, wt. percent |
|---|---|---|
| Alkylbenzenes | 4.02 | 5.83 |
| Polycyclics | 0.27 | 0.38 |
| Isoparaffins | 39.44 | 38.42 |
| n-Paraffins | 1.20 | 3.55 |
| Cyclic-$C_5$ | 10.92 | 12.89 |
| Cyclic-$C_6$ | 0.04 | 0.00 |
| Olefins | 30.40 | 29.19 |
| Diolefins | 13.70 | 9.74 |

From these data it is clear that the aromatics concentration is increased at least forty-five percent, the percent concentration of olefins and diolefins in the feed decreasing in the product, while the concentration of alkyl benzenes increases from a value of 4.02 percent in the feed to 5.83 percent in the product.

In another demonstration, a 0.3 percent platinum-on-magnesium chrysotile catalyst is prepared by forming a paste by admixing the magnesium chrysotile with an aqueous solution of chloroplatinic acid, drying same in an oven at 150° C. for 16 hours. The material is calcined at 1000° F. in air for 16 hours.

A portion of the catalyst composite is placed, as a fixed bed, in an upflow reactor and reduced in 1 atmosphere of $H_2$ at 1000° F. The temperature is then lowered to 950° F. and the gas switched to $N_2$. The catalyst is then contacted with a 50–95° C. cut of a cat naphtha feed.

Feed composition, process conditions and the composition of the effluent are tabulated below.

TABLE IV

Process conditions:
Temperature, ° C.—510
Pressure, p.s.i.g.—10
Gas—$N_2$
V./v./hr.—1

| | Feed composition, wt. percent | Liquid product composition, wt. percent |
|---|---|---|
| Alkylbenzenes | 4.02 | 7.70 |
| Polycyclics | 0.27 | 0.61 |
| Isoparaffins | 39.44 | 37.21 |
| n-Paraffins | 1.20 | 7.00 |
| Cyclic-$C_5$ | 10.92 | 12.78 |
| Cyclic-$C_6$ | 0.04 | 0.00 |
| Olefins | 30.40 | 26.40 |
| Diolefins | 13.70 | 8.30 |

From these data it is observed that the concentration of aromatics increases from 4.02 percent in the feed to 7.70 percent in the product, an increase of approximately 90 percent.

ISOMERIZATION

The complex metal silicates can be used as catalysts or promoters for isomerization reactions, or reactions wherein a feed which contains normal paraffins is converted to one which is enriched in isoparaffins. Notable among such isomerization reactions, and hence a preferred process, is that wherein hydrocarbon feeds or hydrocarbon-containing feed streams are treated to effect the conversion of normal $C_4$, $C_5$, $C_6$ or $C_7$ paraffins, or mixtures thereof, to their respective isomers for octane improvement. For example, n-butane can be converted to iso-butane for subsequent alkylation to produce aviation gasoline.

The isomerization process is typically carried out at temperatures ranging from about 0° C. to about 450° C., and preferably within the range of from about 0° C. to about 100° C. Operation at the lower temperatures favors the production of higher branched, e.g., the doubly branched, isomers which are of particularly high octane values. Space velocity should range between about 1 v./v./hr. to about 10 v./v./hr., preferably between about 2 v./v./hr. to about 5 v./v./hr. As space velocity is increased, the yield is decreased at a given temperature. Hydrogen may be employed in the reaction, but in any event the pressure at which the isomerization reaction is carried out should range from about 0 to about 1000 p.s.i., and preferably from about 0 to about 500 p.s.i.

Typically, an active component such as aluminum halide is distended upon a complex metal silicate or, alternatively, a complex metal silicate having a metal hydrogenation (or dehydrogenation) component. Preferred complex metal silicates are those species which are of low sodium content and contain oxides of Group III-A metals, e.g., aluminum, and Group VIII metals, e.g., cobalt, nickel, platinum, palladium, and the like.

EXAMPLE 24

To demonstrate a typical low-temperature isomerization reaction, a first run is conducted wherein aluminum bromide is distended on a selected calcined form of chrysotile, ($Mg_3(OH)_4Si_2O_5$, positively identified by X-ray diffraction data. Thus, a hydrated magnesium chrysotile in the physical form of thin wall tubes having an average wall thickness of 30 A., an internal diameter of 120 A., and a surface area of 150 m.$^2$/g. is calcined in a furnace at 540° C. for 16 hours. One and sixty-eight hundredths parts by weight of the chrysotile is added per 1 part by weight of aluminum bromide to a glass-lined reaction vessel, into which is also charged 5 parts by weight of n-hexane per 1 part of aluminum bromide. The mixture is agitated for 4 hours at ambient temperature and autogenous pressure. The reaction product mixture is then neutralized with a solution of 15 weight percent sodium hydroxide charged into the vessel. The hydrocarbon layer is separated from the vessel and analyzed by gas chromatography.

For comparative purposes a second run is then conducted at identical conditions except that unsupported aluminum bromide is employed in the reaction.

The composition of the various isomers in the total products and the $C_6$ isomer distribution in the two different products, in terms of weight percent composition, are given as follows.

TABLE V

| Isomers | First run- total prod. composition | First run-$C_6$ isomer distribution | Second run- total prod. composition | Second run-$C_6$ isomer distribution |
|---|---|---|---|---|
| n-$C_6$ | 26.7 | 33.9 | 70.9 | 83.2 |
| 3-MP[1] | 7.0 | 8.9 | 2.6 | 3.1 |
| 2-MP[1] | 17.8 | 22.6 | 6.4 | 7.5 |
| 2,3-DMB[2] | 5.3 | 6.7 | 2.2 | 2.6 |
| 2,2-DMB[2] | 22.0 | 27.9 | 3.1 | 3.6 |
| Cracked | 21.2 | | 14.8 | |

MP = ethyl pentane.
DMB = dimethyl butane.

In comparing these results, it is thus apparent that the chrysotile is quite effective as a promoter, especially for the production of the high octane doubly branched isomers. Thus, in the set of data wherein chrysotile is employed as a promoter, 34.6 weight percent of 2,2- and 2,3-dimethylbutane are obtained in the liquid reaction product as contrasted with only 6.2 weight percent of these doubly branched isomers in the run wherein the aluminum bromide is not promoted.

HYDROISOMERIZATION

Hydroisomerization reactions can also be conducted with the catalyst of this invention, the purpose of such process being to convert feeds containing high concentrations of normal paraffins, particularly $C_5$ and $C_6$ n-paraffins, to products which have been enriched in iso-paraffin content. In conducting such reactions, temperatures on the order of from about 120° C. to about 260° C., and preferably from about 175° C. to about 230° C., and pressures on the order of from about 150 p.s.i. to about 750 p.s.i., and preferably from about 200 p.s.i. to about 500 p.s.i., are employed. Hydrogen is fed into the reaction at a rate of from about 1000 to about 10,000 s.c.f./bbl. of feed, and preferably from about 1000 to about 5000 s.c.f./bbl. of feed. While space velocity, LHSV, can range from about 0.5 to about 5, it preferably ranges from about 1 to about 2. In the reaction, the feed is normally contacted with the catalyst while the former is in mixed phase—viz., liquid and gas. At constant contact time, the reaction appears favored by lower pressures, and at lower reaction temperature the selectivity of the catalyst does not appear to be affected by total reaction pressure. The hydrogen-to-hydrocarbon mole ratio should range from about 0.5:1 to about 10:1, and preferably from about 2:1 to about 5:1.

The preferred chrysotile catalysts are those of an acidic character. For best results, the chrysotile bases, e.g., magnesium chrysotile, nickel chrysotile, cobalt chrysotile, aluminum substituted forms of these chrysotiles, or mixed metal modifications of these and other metals, are treated with acidic agents such as hydrogen fluoride, aluminum chloride and the like. Prior to such treatment, the acidic base is impregnated with a hydrogenation component—viz., a metal, or metals, suitably a Group VIII metal, preferably a noble metal such as platinum, palladium, or mixture of these and other metals. The metal is generally added in the form of a salt and then reduced. Many times acidic agents such as hydrogen chloride or hydrogen bromide are added to the feed to maintain catalytic activity.

EXAMPLE 25

For purpose of demonstrating such process, a 20% aluminum substituted form of magnesium chrysotile, in flake form with surface area of 350 m.$^2$/g., is synthesized, dewatered by centrifugation and dried at 50° C. The flakes are then slurried with a 10% aqueous solution of ammonium nitrate, acetic acid is added to provide a pH of 3.5, and the solution is then heated to 83° C. and this temperature maintained for two hours. The product, identified as the flake form of chrysotile by X-ray diffraction, is then filtered from the solution and then impregnated with a solution of palladium tetra ammonium chloride, in concentration sufficient to provide 0.5% palladium on the finished catalyst.

The catalyst is dried at 120° C. for 16 hours in a vacuum, then ground to a powder, and fused into pellets. The pellets are then crushed to provide particle sizes of 14–35 mesh (Tyler series). The pellets are then calcined at 430° C. in a muffle furnace for 3 hours, cooled and a portion of the catalyst charged to a reactor.

Hydrogen is then cut into the reactor and the pellets reduced at 290° C. for 1 hour. The temperature of the reactor is thereafter lowered to 250° C., and operated at atmospheric pressure. Hydrogen is purified to remove oxygen and water at 0° C., and is then passed through n-hexane, saturated, and then fed into the reactor. The effluent from the reactor is analyzed by G.C. to determine the concentration of $C_6$ iso-paraffins in the product.

The results are shown as follows.

TABLE VI

| | |
|---|---|
| Mole $H_2$/mole n-$C_6$ | 16 |
| W./H./W. | 1.0 |
| Cat age on Stream | 1 |
| n-$C_6$ conversion, percent [1] | 9.2 |

[1] $\dfrac{\text{Mol i-}C_6 \text{ (2-MP, 3-MP, 2,3-DMB, 2,2-DMB)}}{\text{Total mol } C_6 \text{ (i-}C_6 + \text{n-}C_6)}$ (MP = methyl pentane)
(DMB = dimethyl butane).

HYDROCRACKING

These novel catalysts are suitable for use in hydrocracking at relatively low temperature and relatively high pressure to provide a process of considerable flexibility in changing the ratios and character or quality of the products. Suitably, temperatures on the order of from about 250° C. to about 450° C., and preferably from about 350° C. to about 425° C., and pressures ranging from about 400 to about 3000 p.s.i., and preferably from about 500 to about 2500 p.s.i., are used to convert middle-boiling or high-boiling materials into high octane gasoline and jet fuel as well as for producing feedstocks for catalytic reforming. Space velocities, LHSV, can range from about 0.1 to about 10 but preferably range from about 1 to about 3, and hydrogen gas recycle rates are generally maintained at from about 3000 to about 12,000 s.c.f./bbl., and preferably from about 4000 to about 8000 s.c.f./bbl.

The catalysts can be used as hydrocracking conditions in both sweet (low sulfur) and sour (high sulfur) operations, or in the presence of both sulfur and nitrogen. Conditions of temperature and feed, i.e., sulfur and nitrogen, can be adjusted to maximize yields of gasoline or jet fuel.

The several types of operation for which the catalysts of this invention are useful can be illustrated in the now conventional process wherein three reactors are employed in series, a first reactor of the series constituting a hydrofiner, a second reactor of the series constituting a first stage hydrocracker, and a third reactor of the series constituting a second stage hydrocracker. In such operation, a catalyst is employed in the hydrofiner which is active in the presence of both organic sulfur and organic nitrogen and the conditions of operation are relatively mild. Cracking is held to a minimum, and both the sulfur and nitrogen are converted essentially to hydrogen sulfide and ammonia, respectively. Neither the hydrogen sulfide nor ammonia need be removed from the effluent passed from the hydrofiner to the first stage hydrocracker and hence the latter reactor is operated with sulfur and nitrogen present. The second stage hydrocracker of such reactor series can be operated sweet, by removal of the hydrogen sulfide from the effluent of the first stage hydrocracker, or sour if desired, dependent upon the nature of the catalyst employed. The catalysts of the present invention can be used in each type of operation.

The wide range of products obtainable from this process is the result of forming complex metal silicates containing selective hydrogenation components so that, in effect, dual-functional catalyst are produced. The cracking function is provided by the complex metal silicate and the hydrogenation function is provided by a metallic hydrogenation component, e.g., Group VI–B, VII–B and VIII metals, of the Periodic Table of the Elements, such as molybdenum, tungsten, platinum, nickel, cobalt and the like.

The hydrogenation component can be a metal, or mixture of metals, e.g., a Group VI–B, VII–B, or VIII metal, impregnated or otherwise deposited onto a chrysotile base or the hydrogenation component can be incorporated into the chrysotile structure at the time of synthesis, or both. For example, preferred Group VIII noble metal components, e.g., platinum or palladium, or mixtures of these and other metals, can be deposited on a magnesium, nickel, or other type of chrysotile base, or chrysotile base containing a combination of magnesium, nickel, aluminum, platinum, palladium, and the like. Illustrative of preferred catalysts which are useful in hydrocracking reactions are the mixed metal chrysotiles such as, e.g., magnesium-aluminum chrysotile impregnated by palladium or platinum, or both; magnesium-nickel chrysotile impregnated by molybdenum or tungsten, or both; magnesium-tungsten chrysotile impregnated by nickel or cobalt, or both, magnesium-molybdenum chrysotile impregnated by nickel or cobalt, or both; nickel-tungsten chrysotile; cobalt-molybdenum chrysotile, and the like.

Feedstocks which can be hydrocracked contain paraffins, olefins, naphthenes and aromatics. These materials are included in virgin or previously processed refinery streams boiling above about 200° C., and preferably above about 235° C., e.g., light cat cycle oil boiling between about 200–315° C., heavy cat cycle oil boiling between about 315–425° C., light virgin gas oil boiling between about 200–315° C., and heavy virgin gas oil boiling between about 315–540° C., and higher. Examples of previously processed refinery streams include coker stocks, steam cracked stocks and cat cracker stocks.

EXAMPLES 26–37

To demonstrate the use of complex metal silicates as catalysts, for these types of hydrocracking operations, portions of freshly synthesized chrysotiles, both in the physical form of tubes and flakes are centrifuged and dewatered, tray-dried at 180° C. with circulating air, positively identified by X-ray diffraction data, charged to an Iler mill and ground to a very fine powder. The initial physical form of the complex metal silicates, i.e., as tubes or flakes, is, of course, unaffected by milling.

The portions of powder are then exchanged with ammonium nitrate by admixing with a 10 weight percent aqueous solution of ammonium nitrate in water, the pH of which is lowered to 3.5 by addition of acetic acid. Contact between the solution and the powder is maintained for a period of 2 hours, after which time the powder is dewatered by centrifugation and washed. This exchange procedure is twice repeated.

The portions of thrice exchanged material are then used per se, or impregnated with a small concentration of metal, or metals, as hereinafter defined. Impregnation is acomplished by dissolving sufficient of a metal salt, or salts, e.g., palladium or platinum chloride, in aqueous hydrochloric acid or ammonia to provide the desired metal concentration and then the portions of exchanged material are contacted with the solution and treated at a state of incipient wetness. The portions are then dried for 16 hours at 50° C. and then mixed with sufficient of an organic binder (Sterotex) to form a 2 percent by weight mixture of Sterotex and powder. The mixture is then pilled, crushed to particles of 14–35 mesh size (Tyler series), and then calcined at 540° C. to burn out the binder. Upon cooling, portions of the catalyst are charged to reactors and runs conducted in sweet and sour hydrocracking operations. In the sour hydrocracking operations, runs are made with and without added nitrogen.

After loading a reactor with catalyst, it is purged with nitrogen and then pressured to 1500 p.s.i. with hydrogen at 370° C. for two hours. The temperature is then lowered to 215° C., feed is cut in and temperature is then raised to obtain conversion of the feed to $C_5$-220° C. gasoline. In the runs, the space velocity, LHSV, is maintained at about 1, pressure is maintained at about 1500 p.s.i. and the hydrogen gas recycle rate at about 7000–8000 s.c.f./bbl. Temperature is maintained at about 260° C. for sweet hydrocracking (second stage), at about 290° C. for sour hydrocracking (second stage) and at about 365° C. for sour plus nitrogen hydrocracking (first stage).

The feed employed in the sweet hydrocracking runs is a hydrofined light cat cycle oil containing very little sulfur or nitrogen. A similar type of feed, spiked with sulfur or both nitrogen and sulfur, is employed in the sour hydrocracking runs. In the sour hydrocracking runs simulating first stage hydrocracking operation, the feed contains, by weight, 10,000 p.p.m. of sulfur (thiophene) and 1000 p.p.m. of nitrogen (n-butylamine), and in the runs simulating sour second stage hydrocracking operation, the feed contains 3000 p.p.m. sulfur (thiophene). For the runs simulating sour hydrocracking operations, the catalysts are previously sulfided by passing a light cat cycle oil feed containing 3.2 weight percent sulfur over the catalysts for a period of 16 hours at 260° C.

The results of these tests are tabulated below.

TABLE VII.—RUNS SIMULATING FIRST STAGE HYDRO CRACKING

|  | Sour: contains sulfur plus nitrogen | |
|---|---|---|
| Example No | 26 | 27 |
| Impregnated metal | Ni | W. |
| Chrysotile base | 10% W, 90% Mg | 5% Ni, 95% Mg. |
| Temperature, °C | 220 | 220. |
| Surface area, m.²/g | 277 | 160. |
| Physical form of base | Flakes | Tubes. |
| Conversion to 220° C. products, percent | 31 | 33. |

RUNS SIMULATING SECOND STAGE HYDROCRACKING

| | Sweet | | | | | | Sour | | | |
|---|---|---|---|---|---|---|---|---|---|---|
| Example No. | 28 | 29 | 30 | 31 | 32 | 33 | 34 | 35 | 36 | 37 |
| Impregnated metal. | 0.5% Pd | 0.5% Pd | 0.5% Pd | | 0.3% Pt | 0.5% Pd | W | Ni | W | W. |
| Chrysotile base | 100% mg | 8% Al, 92% Mg. | 100% Ni | 0.3% Pt, 99.7% Mg. | 0.3% Pt, 99.7% Mg. | 20% Al, 80% Mg. | 100% Ni | 10% W, 90% Mg. | 5% Ni, 95% Mg. | 100% Ni. |
| Temperature, °C. | 375 | 375 | 375 | 400 | 400 | 400 | 375 | 375 | 375 | 375. |
| Surface area, m.²/g. | 157 | 87 | 86 | 281 | 281 | 392 | 86 | 277 | 160 | 359. |
| Physical form of base. | Tubes | Tubes | Tubes | Flakes | Flakes | Flakes | Tubes | Flakes | Tubes | Flakes. |
| Conversion to 220° C.-products, percent. | 23 | 33 | 16 | 37 | 30 | 35 | 26 | 47 | 33 | 26. |

MID-DISTILLATE HYDROCRACKING

For mid-distillate hydrocracking a virgin or cracked stock, e.g., cat cracker stock, steam cracker stock or coker oil, boiling above about 340° C. and ranging to about 540° C., and higher, containing both organic sulfur and organic nitrogen can be employed. Vacuum or atmospheric gas oils containing from about 1 to about 4 weight percent sulfur, and to about 2000 p.p.m. of nitrogen, can thus be processed to produced high concentrations of middle distillates, relative to lower boiling cracked products.

The conditions employed for mid-distillate hydrocracking are within the ranges described for hydrocracking, but temperatures are generally a little higher than required for more conventional hydrocracking. This is because the catalysts employed for mid-distillate hydrocracking have lower acidity than conventional hydrocracking catalysts. Typically, temperatures in mid-distillate hydrocracking ranges from about 370–450° C.

The chrysotile catalyst is prepared so that it is of intermediate acidity ranging from about 0.2 to about 0.9, and preferably from about 0.2 to about 0.5 as measured by pyridine adsorption. Pursuant to this technique, the acidity is measured by placing the catalyst on a microbalance and heating under vacuum at 427° C. for one hour. The temperature is then lowered to 260° C. and the catalyst then subjected to a pressure of two millimeters of pyridine. Under these conditions the catalyst takes up pyridine until equilibrium is reached. The amount of pyridine absorbed at these conditions measured in millimoles per gram of catalyst is taken as the measure of the acidity of the catalyst.

The chrysotile catalyst can be used in the form of tubes or flakes, but tubular forms of chrysotile are generally preferred. Preferred forms are magnesium chrysotile and nickel chrysotile. Nickel chrysotile is of particularly high activity and selectivity in conversion of hydrocarbon feeds to mid-distillate liquid products, with high ratios of middle distillates to lower boiling products. Magnesium chrysotile with 10–35 mole percent of the magnesium substituted by aluminum is also preferred.

The catalysts are generally formed with the desired concentrations of metals, e.g., nickel, magnesium and aluminum, at the time of synthesis. Additional hydrogenation components are often added to the catalyst composite. Thus, it is often desirable to add another metal, or metals (or metal compounds) to the composite, e.g., by impregnation. Groups VI–B, VII–B and VIII metals, particularly cobalt and molybdenum, and mixtures thereof, have been found particularly useful in mid-distillate hydrocracking.

EXAMPLE 38

To demonstrate mid-distillate hydrocracking with catalyst of this type, a selected species of chrysotile is synthesized as identified hereafter, a portion thereof dewatered by centrifugation, dried at 180° C. in circulating air, identified by X-ray diffraction, ground to a fine powder and then impregnated by the above-described incipient wetness technique with a solution of ammonium molybdate. Sufficient solution is used to provide 12.5 weight percent of the salt, calculated as molybdenum oxide, in the powder. The portion of impregnated catalyst is dried for 16 hours at 50° C., then mixed with sufficient of an aqueous solution of Sterotex binder to leave a residual of 2 weight percent of the Sterotex binder in the catalyst. The portion of catalyst is then crushed and pilled to 14–35 mesh (Tyler series), and then calcined at 540° C. to burn out the Sterotex binder.

A portion of the catalyst, upon cooling, is then charged to a reactor, the reactor is sealed, and pressured with hydrogen to 1500 p.s.i. Safanaya virgin gas oil, containing about 2.5 weight percent sulfur and 500 p.p.m. of nitrogen, and having a boiling range 340° C.–540° C., and higher, is then cut into the reactor. To sulfide the catalyst, the reactor is initially maintained at a temperature of 335° C. and after four days the catalyst is sulfided. The temperature is then increased to 420° C. and a mid-distillate hydrocracking run conducted. In the run, the space velocity, LHSV, is maintained at about 1, hydrogen pressure at 1500 p.s.i., and hydrogen gas recycle rate at 2000–3000 s.c.f./bbl.

The results of this run are given in the table below.

TABLE IX

Example No.: 39
Impregnated metal: Mo
Chrysotile base: 100% Ni
Surface area, m.²/g.: 86
Physical form of base: Tubes
Conversion to 40 340° C. products, percent: 40
Vol. percent 160–340° C./vol. percent $C_5$–160° C.: >8

CRACKING

The complex metal silicates can also be utilized as catalysts in cracking processes, or processes wherein decomposition of hydrocarbon is accomplished by contacting suitable hydrocarbon feeds with a catalyst at elevated temperatures. The purposes of cracking is generally to produce gasoline or heating oils from higher boiling hydrocarbon fractions, though specific gaseous hydrocarbons such as ethylene, propylene, butylene, isobutylene, or the like, can be recovered, if desired. Suitable feedstocks for cracking are those boiling above about 260° C., this including virgin or treated stocks and atmospheric or vacuum gas oils boiling up to about 600° C. At times, gasoline boiling range materials, or residuum boiling above 600° C., are cracked.

When using these novel catalysts, catalytic cracking is carried out at substantially atmospheric pressure or at somewhat elevated pressure, e.g., up to about 50 p.s.i., and at temperatures ranging from about 400 to about 650° C., and preferably from about 475° C. to about 550° C., usually in fluid or moving catalyst beds. In once-through operation, about 30–60% conversion is usually obtained, and generally some of the unconverted material boiling above about 220° C. is recycled to increase gasoline yield.

Illustrative of preferred catalysts useful in catalytic cracking reactions are, e.g., magnesium chrysotile and mixed metal modifications such as magnesium-aluminum chrysotile. To illustrate the use of complex metal silicates generally for use in a catalytic cracking process, the following selected data are given.

EXAMPLE 39

To demonstrate the advantages of such composite catalysts, a portion of the basic chrysotile material (20 mole percent Al, 80 mole percent Mg flakes), as synthesized, is dewatered by centrifugation, dried at 180° C. in air, identified by X-ray diffraction, and then mixed or co-gelled, in weight proportions, with an amorphous catalyst (13% alumina and 87% silica) sufficient to provide 15% of the chrysotile in the finished catalyst. Such gel is then spray dried to form 40-60 micron spherical particles.

A portion of the catalyst is charged to a fluid bed reactor. Steam is introduced for two minutes to strip the catalyst and purge the reactor of air. A vaporized feed of East Texas light gas oil, boiling between 340–455° C., is then passed over the catalyst for two minutes at a reactor temperature of 510° C. The feed is introduced at sufficient space velocity to obtain 60 percent conversion. The higher boiling products of the reaction are condensed and collected while the uncondensed light gas is directly measured and analyzed by mass spectrometry. The condensed products are measured by gas chromatography. A sample of the catalyst is removed to measure the carbon content.

Standard commercially used silica-alumina and zeolite cracking catalysts are run under identical conditions, and the results of these runs compared as tabulated below.

TABLE X

| Catalyst | Silica-alumina | Zeolite | 20% alumina flakes (15% chrysotile-85% silica-alumina) |
|---|---|---|---|
| W./hr./w | 1.6 | 17.1 | 10.2 |
| Conversion, percent | 60 | 60 | 60 |
| Yield, wt. percent: | | | |
| Coke | 4.7 | 0.5 | 2.8 |
| $C_3^-$ | 11.5 | 5.3 | 9.6 |
| $C_4$ | 12.2 | 8.1 | 11.8 |
| $C_5$- 220° C | 31.7 | 46.2 | 35.8 |

As shown by the space velocity data, the chrysotile catalyst is intermediate in activity between commercial silica-alumina and zeolite catalyst types. They form slightly less coke and less naphtha than silica-alumina catalyst, but approximately the same $C_3$ and $C_4$ yields.

Aluminum substituted forms of chrysotile have been found particularly active for cracking reactions, particularly where aluminum is substituted for magnesium, nickel, cobalt and other metals, in molar concentrations ranging from about 10% to about 30%, preferably from about 20% to about 30%.

EXAMPLE 40

A run is made, similar in all respects to that made pursuant to Example 39, except that essentially pure magnesium chrysotile in flake form with surface area of 410 m.²/g. is incorporated within the silica alumina matrix. This catalyst is also quite active for cracking reactions.

EXAMPLES 41–44

The following illustrative data demonstrate the efficacy of a magnesium chrysotile catalyst wherein certain molar concentrations of the magnesium have been substituted or replaced by aluminum in the basic chrysotile structure. On the one hand, as will be observed from the following data, a 10% or 35% replacement of the magnesium has little effect on the cracking activity of the catalyst, and a 50% replacement of the magnesium by aluminum has virtually no effect. On the other hand, a 20% substitution of the magnesium metal by aluminum metal produces considerable activity.

In preparation of the catalysts, aluminum chloride hexahydrate and magnesium chloride hexahydrate, in varying concentrations, are dissolved in water to provide the desired concentration of aluminum metal relative to the concentration of magnesium. Ludox (or silica sol), and then sodium hydroxide, is then added to the mixtures to gel the silica and precipitate the magnesium, alumina and silica. Crystallization is then accomplished by heating at 250° C. for 24 hours. The several portions of catalyst are then dewatered by centrifugation, dried at 180° C., identified by X-ray diffraction, powdered, pressed on a hydraulic ram, the compacted forms of catalyst then crushed to 14–35 mesh (Tyler series), and then calcined at 540° C. for 16 hours.

The portions of catalyst are then charged to reactors, and the temperature adjusted to 280° C. A stream of helium is then passed through a saturator filled with cumene at 18° C. and then passed at 0.3 w./w./hr. into the reactor and contacted with the catalyst. The effluent from the reactor is then analyzed by gas chromatography to determine the amount of conversion of the cumene to benzene and propylene.

The results are tabulated below.

TABLE XI

| Catalyst:[1] | | | | |
|---|---|---|---|---|
| Al substitution, mole percent | 10 | 20 | 35 | 50 |
| SA, m.²/g | 360 | 392 | | |
| Cumene conversion, percent[2] | 10 | 31 | 0.1 | 0 |
| k (hr.⁻¹)[3] | 0.034 | 0.11 | 0.0004 | 0 |

[1] All catalysts are flakes.
[2] W./hr./w.=~0.3; Temp.=280° C.
[3] First order rate constant for cumene cracking reaction.

HYDROGENATION (HYDROFINING)

An important application of the complex metal silicates of the present invention involves hydrogen saturation of unsaturated hydrocarbons such as aromatics and olefins, including monoolefins and polyolefins, whether straight chain or branched chain, and whether substituted or unsubstituted. In fuels processing the saturation of lower molecular weight olefins having a carbon content ranging from about 2 to about 12, and preferably from about 2 to about 6, is generally of greatest importance. For example, butylene polymers and light catalytically cracked naphtha, steam cracked naphtha, and the like, can be hydrogenated to produce aviation gasoline components. In hydrogenation, hydrogen atoms are directly added to unsaturated bonds of the material being processed. Other important applications of hydrogenation of which the present catalysts are suitable include refinement of lube oil distillates, production of high quality diesel oils, heating oils, and kerosene. The catalysts are also suitable for use in removal of organic nitrogen and sulfur to improve the color and stability of various products, e.g., heating oils.

The preferred chrysotile catalysts are those forms of high surface area, preferably flake forms ranging in surface area from about 250 m.²/g. to about 500 m.²/g., and higher. The catalyst used in such reactions is preferably one of mild acidity, and while the hydrogenation component can be incorporated into the chrysotile structure at the time of its formation, by ion exchange or by impregnation, or deposited thereon as by impregnation, it has been found that incorporation of the hydrogenation component into the structure provides better dispersion of the metal, or mixture of metals. Such catalyst is thus more stable, there is less tendency of the metals to agglomerate, and better dispersion is maintained throughout the reaction. Activity maintenance is generally superior.

Preferred metals for incorporation, or deposition, but preferably for incorporation ab initio within the chrysotile structure are those of Groups VI–B, VII–B and VIII of the Periodic Table of the Elements, including, e.g., chromium, cobolt, molybdenum, rhenium, cobalt, nickel, platinum, palladium, or mixtures of these and other metals.

Hydrogenation reactions are generally conducted at temperatures ranging from about 50° C. to about 450° C., preferably from about 150° C. to about 350° C., and at pressures ranging from about 100 p.s.i. to about 3000 p.s.i., preferably from about 200 p.s.i. to about 500 p.s.i. Space velocities, LHSV, generally range from about 0.5 to about 5, and preferably from about 1 to about 2. Hydrogen is generally introduced at a rate of from about 300 to about 5000 s.c.f./bbl., and preferably from about 500 to about 3000 s.c.f./bbl.

EXAMPLES 45–47

To demonstrate the high activity of chrysotiles as hydrogenation catalysts, a series of selected data are set out below. The data show a series of runs wherein nickel chrysotile flakes per se are used as a catalyst for hydrogenation of benzene. A comparative run is also described using similar nickel chrysotile flakes, to which tungsten has been added. A third run is also described wherein 20 mole percent aluminum substituted magnesium chrysotile flakes is employed, to which palladium has been additionally added by impregnation. These catalysts are prepared and identified in the same manner as those used and previously described as hydrocracking catalysts. All of these runs are compared with a conventional commercial platinum-on-alumina catalyst, consisting of purchased $\frac{1}{16}$-inch extrudates crushed to 14–35 mesh (Tyler series).

In the runs, the catalysts are charged to the reactors and pretreated with hydrogen at 370° C. for 16 hours to assure complete reduction of the catalyst. This flow is then terminated. Hydrogen is then passed through benzene at 18° C. to saturate the hydrogen stream, and the stream is then passed into the respective reactor at the temperature indicated, and at a rate of 1 w./hr./w. The pressure is maintained at atmospheric. The effluent from the individual reactors is analyzed by gas chromatography to determine the amount of conversion of benzene to cyclohexane.

The results are tabulated below.

TABLE XII

| Catalyst: | | | | |
|---|---|---|---|---|
| Impregnated metal | | 10% W | 0.5% Pd | 0.6% Pt. |
| Base | 100% Ni | 100% Ni | 20% Al | Al₂O₃ |
| Temperature, ° C. | 54 | 80 | 235 | 51. |
| Conversion to cyclohexane, percent | 29 | 45 | 29 | 56. |
| $k$ (hrs.⁻¹)[1] | 0.35 | 0.62 | 0.34 | 0.81. |
| Base, surface area, 359 m./g. | 359 | 392 | | |
| Physical form of chrysotile. | Flakes | Flakes | Flakes | |

[1] First order rate constant for benzene hydrogenation.

These data clearly show that these catalysts possess very good hydrogenation activity, this being true not only of chrysotiles wherein the hydrogenation component is deposited or impregnated into the structure, but also for chrysotiles wherein the hydrogenation component is incorporated ab initio into the structure.

HYDRODESULFURIZATION

The catalysts of this invention are particularly applicable for use in processes for hydrodesulfurization of hydrocarbons, especially heavy hydrocarbon feedstocks having an initial boiling point of about 340° C., a fifty percent point of at least about 400° C., and higher, e.g., atmospheric gas oils, vacuum gas oils, atmospheric residuums, and the like. The catalysts are suitable for direct or indirect hydrodesulfurization reactions. Certain of these catalysts, having pore sizes ranging from about 30 A. to about 120 A. diameter, have thus been found particularly useful for direct treating feedstocks which contain metal-bearing asphaltenes, materials normally found in residuals, which normally poison and deactivate hydrodesulfurization catalysts. Indirect hydrodesulfurization of feedstocks can also be accomplished by distilling out gas oil fractions from a heavier residual, treating the gas oil to remove sulfur, and then blending the desulfurized gas oil with the untreated residuum. The composite product, of course, contains less sulfur than prior to such treating and blending. Typically, e.g., a fuel oil containing 2–3 percent by weight sulfur can thus be treated to meet specifications requiring a maximum sulfur content of 0.5 percent by weight sulfur.

In direct treatment of hydrocarbon feedstocks, e.g., in a fixed bed or ebulluting bed, it is generally preferred to operate, at the start of the run, at temperatures of about 340° C. to about 390° C., and at temperatures ranging from about 390° C. to about 490° C. at end-of-run conditions. The pressures employed usually range from about 300 p.s.i. to about 3000 p.s.i., and preferably from about 800 p.s.i. to about 1500 p.s.i. Hydrogen rates range generally from about 500 s.c.f./bbl. to about 10,000 s.c.f./bbl., and preferably about 1000 s.c.f./bbl. to about 5000 s.c.f./bbl. The liquid hourly space velocities, LHSV, range generally from about 0.1 to about 10, and preferably from about 1 to about 3. The conditions employed for indirect dehydrosulfurization are generally similar except the temperature employed is about 50 centigrade degrees less at either start-of-run or at end-of-run conditions.

The hydrodesulfurization catalyst is generally comprised of a composite which includes a chrysotile base and a hydrogenation component, viz., a metal, a metal oxide, or a metal sulfide, wherein the metal is from Groups VI-B, VIII, or both, of the Periodic Table of the Elements. The concentration of the metal, or mixture of metals incorporated within the chrysotile base can vary widely, dependent on the nature of the hydrogenation component and feedstock. The metal, or mixture of metals, of which cobalt, molybdenum, tungsten, and nickel are preferred, is generally incorporated within the base in concentration ranging from about 0.1 to about 25 percent by weight, and preferably from about 0.3 to about 15 percent by weight, of the total composite. When hydrogenation components such as the oxides or sulfides of cobalt and molybdenum are utilized, the concentration will be generally 1 to 5 percent and 5 to 15 percent, respectively, based on the total weight of the composite. The chrysotile base, e.g., magnesium chrysotile, nickel chrysotile, or either, wherein the magnesium or nickel is substituted in part by aluminum, is preferably one of pore size ranging between about 30 A. and 120 A. diameter. Tubes of pore size ranging between about 70 A. and 80 A. diameter, and flakes ranging between about 30 A. and 80 A. diameter, particularly the former, are most preferred. Chrysotiles of such pore sizes are readily formed and pore sizes readily controlled, within close limits, pursuant to the present inventive process.

To demonstrate the present process, a series of data is selected and set forth below.

EXAMPLES 48–53

A series of catalysts, as described hereafter, is synthesized, dewatered, dried, identified by X-ray diffraction, ground to a fine powder and impregnated by incipient wetness technique. The catalysts are then dried, admixed with an organic binder, pilled, crushed to 14–35 mesh (Tyler series) and calcined to burn out the organic binder. The catalysts are then charged to reactors and sulfided at 335° C., all as described with reference to the catalysts used for mid-distillate hydrocracking, supra.

The temperature of operation is maintained at 335° C. and the pressure at 1500 p.s.i. The sulfur-bearing feed is introduced to the reactors at a rate of 1 v./v./hr. and hydrogen at a rate of 2000 to 3000 s.c.f./bbl.

The results of these runs are tabulated below.

TABLE XIII

| Example No | 48 | 49 | 50 | 51 | 52 | 53 |
|---|---|---|---|---|---|---|
| Impregnated metals | Co/Mo | Co/Mo | Mo | Mo | Mo | Co/Mo. |
| Chrysotile base | 100% Mg | 8% Al, 92% Mg | 5% Ni, 95% Mg | 100% Ni | 100% Ni | 20% Al, 80% Mg. |
| Surface area, m.²/g | 147 | 87 | 160 | 86 | 359 | 392. |
| Physical form of chrysotile | Tubes | Tubes | Tubes | Tubes | Flakes | Flakes. |
| Average [1] pore size of openings, A | 110 | 225 | 115 | 180 | 32 | 85. |
| Percent sulfur in product | 1.05 | 1.29 | 1.17 | 1.20 | 1.06 | 1.12. |
| Percent sulfur removal | 59.5 | 50.2 | 54.8 | 53.9 | 59.1 | 56.7. |

[1] Calculated by 4 (pore volume)/surface area.

HYDRODENITROGENATION

Chrysotiles are suitable for conducting hydrodenitrogenation processes, or processes for treating feedstocks containing organic nitrogen compounds, under conditions such that the nitrogen content is significantly reduced. Feedstocks which can be processed are nitrogen-bearing virgin and cracked stocks boiling above 180° C., typical among which are light and heavy cat cracker stocks, coker gas oils, middle distillates and virgin gas oils. Middle distillates or heavy cat cycle stocks which can be processed are those boiling from about 220° C. to about 340° C., or lighter stocks boiling in the range of from about 220° C. to about 290° C., gas oils boiling above about 340° C., e.g., light gas oils boiling within the range of from about 340° C. to about 450° C., and heavy gas oils boiling within the range of from about 450° C. to about 540° C., and higher.

Suitable hydrodenitrogenation catalysts are formed by compositing a chrysotile base and a hydrogenation component, particularly one selected from Group VI-B, VII-B and VIII metals, or mixtures of these and other metals, of the Periodic Table of the Elements. Representative of these metals are molybdenum, chromium, tungsten, rhenium, iron, cobalt and nickel and metals of the platinum group, e.g., platinum and palladium, as well as combinations of these metals, their oxides, or sulfides. Particularly desirable metal oxides are the oxides of nickel and cobalt, and a particularly desirable combination of such oxides is that of the oxides of nickel and molybdenum, such oxides being readily combinable with chrysotile as by impregnation thereon.

The amount of the hydrogenation component combined with the chrysotile base can vary widely and will depend on the feedstock as well as on the particular nature of the hydrogenation component. Generally, the amount of the component will vary from about 0.1 to about 25 percent by weight, based on the total weight of the composite. When a metal of the platinum series is employed, the amount will generally range from about 0.1 to 5 percent. When hydrogenation components such as the oxides and sulfides of molybdenum, cobalt, tungsten, chromium, iron and nickel are employed, the amount will generally range from about 2 to 25 percent, and when the oxides of nickel and molybdenum are employed, the amount will range generally from about 1 to 5 percent, and 5 to 15 percent, respectively. A composite of about 3 weight percent nickel oxide and 10 weight percent molybdenum oxide is particularly suitable.

Particularly preferred chrysotiles for use as bases include, e.g., magnesium chrysotile, nickel chrysotile, cobalt chrysotile and the various forms thereof wherein these metals are substituted by aluminum.

Hydrodenitrogenation operations are generally conducted at pressures ranging from about 500 p.s.i. to about 2000 p.s.i., and preferably from about 800 p.s.i. to about 1500 p.s.i., at hydrogen gas rates ranging from about 1000 s.c.f./bbl. to about 10,000 s.c.f./bbl., and preferably from about 1000 s.c.f./bbl. to about 5000 s.c.f./bbl., and at superficial liquid hourly space velocities, LHSV, ranging from about 1 to about 5, and preferably from about 1 to about 2. Temperatures generally range from about 350° C. to about 390° C. at start-of-run conditions and from about 390° C. to about 430° C. at end-of-run conditions.

EXAMPLES 54-59

To demonstrate the hydrodenitrogenation process, a series of catalysts is prepared as in those runs demonstrated by reference to preceding Examples 48–53. These catalysts, identified in the table immediately below, are employed to process a nitrogen-bearing feed fed into the reactors at a rate of 1 v./v./hr. with hydrogen at a rate of 2000 to 3000 s.c.f./bbl. of feed. A 1500 p.s.i. pressure is maintained in the reactors which are operated at 377° C.

The results are tabulated below.

TABLE XIV

| Example No | 54 | 55 | 56 | 57 | 58 | 59 |
|---|---|---|---|---|---|---|
| Impregnated metals | Co/Mo | Co/Mo | Mo | Mo | Mo | Co/Mo. |
| Chrysotile base | 100% Mg | 8% Al, 92% Mg | 5% Ni, 95% Mg | 100% Ni | 100% Ni | 20% Al, 80% Mg. |
| Surface area, m.²/g | 147 | 87 | 160 | 86 | 359 | 392. |
| Physical form of chrysotile | Tubes | Tubes | Tubes | Tubes | Flakes | Flakes. |
| P.p.m. nitrogen in product | 300 | 363 | 262 | 9.6 | 36 | 51. |
| Percent nitrogen removal | 40.0 | 27.4 | 47.6 | 98.1 | 92.8 | 89.9. |

REFORMING

The complex metal silicates are also suitable for conducting reforming, or for use in a process wherein naphtha is catalytically converted in an atmosphere rich in hydrogen to upgrade the naphtha to products of higher octane. The principal reactions which occur in reforming are dehydrogenation of naphthenes to form aromatics, dehydrocyclization of paraffins to form aromatics, isomerization of n-paraffins to form iso-paraffins and ring isomerization.

Reforming is generally conducted at temperatures ranging from about 400° C. to about 550° C., and preferably from about 150 p.s.i. to about 550 p.s.i., preferably from about 250 p.s.i. to about 475 p.s.i. Hydrogen rates range generally from about 3000 s.c.f./bbl. to about 10,000 s.c.f./bbl., and preferably from about 5000 s.c.f./bbl. to about 8000 s.c.f./bbl. and the superficial liquid hourly space linear velocity, LHSV, ranges from about 1 to about 5, and preferably from about 2 to about 4.

The feedstocks employed in these reactions are naphthas boiling within the gasoline range, suitably heavy naphthas boiling in the range of from about 93–190° C. or light naphthas boiling in the range of from about $C_5$-93° C. Naphthenic feeds are more easily reformed, while paraffinic feeds are the more difficult to reform. In selection of a suitable catalyst, a chief consideration, therefore, is to find a catalyst capable of synthesizing aromatics from paraffins and olefins, but particularly from naphthenes. The complex metal silicates of the present invention can be readily modified to produce such reforming activity.

Catalysts found useful in reforming are composites formed from a chrysotile base and a hydrogenation component, the latter being deposited as by impregnation upon the base. Suitable bases are constituted of magnesium crysotile, nickel chrysotile, and mixed metal modifications of these and other chrysotiles, particularly chrysotiles wherein magnesium and nickel are particularly chrysotiles wherein magnesium and nickel are partially replaced or substituted by aluminum. Suitable hydrogenation components, which can be incorporated into the chrysotile structure in original synthesis or deposited thereon as by impregnation, are the Group VI-B, VII-B and VIII metals of the Periodic Table of the Elements, preferred of which are the Group VIII platinum group metals, e.g., platinum, palladium and the like, or mixtures of these with other metals such as rhenium.

Suitably, the hydrogenation component, a metal or mixture of metals, is incorporated or added to the base in concentration ranging from about 0.1 to about 5 percent, based on the weight of the total catalyst, and preferably in concentration ranging from about 0.3 to about 1 percent. In addition, the composite can contain from about 0.1 to about 1 percent of halogen, preferably chlorine or bromine.

EXAMPLES 60–65

To demonstrate the suitability of chrysotiles for use in the formation of reforming catalysts, a series of chrysotiles of varying composition are synthesized, dewatered, dried, identified by X-ray diffraction and ground to a fine powder.

According to a first technique, two catalysts are prepared for use in Examples 60–61, and a second technique is used to prepare the catalysts used in examples. In accordance with the first technique, a first portion of the dry chrysotile powder is slurried in an aqueous solution of tetra amine platinic chloride to exchange platinum onto the surface of the chrysotile. The second catalyst is similarly treated except that a small amount of platinum is added to the chrysotile base at the time of synthesis, and the chrysotile then impregnated with an aqueous solution of perrhenic acid to form a platinum-rhenium catalyst. The impregnated catalysts are filtered from the solution, dewatered by centrifugation and dried for 16 hours at 105° C. in a vacuum.

The impregnated dried catlaysts are then mixed with 2 weight percent of an organic binder, i.e., Sterotex, pilled, crushed to 14–35 mesh (Tyler series) and then calcined in air at 510° C. to burn out the binder. The catalyst is then charged to reactors, stripped with nitrogen and then reduced with hydrogen for one hour at 510° C. and 200 p.s.i.

In accordance with the second procedure, for preparation of catalysts for use in Examples 62–65, the catalysts are prepared in generally similar manner except that a platinum impregnation is performed after the organic binder is burned from the catalyst. The portions of catalyst are impregnated by admixing the aqueous solutions of chloroplatinic acid to the point of incipient wetness to effect the impregnation. The catalysts are then dried in air for 16 hours at 105° C., calcined in air at 510° C., charged to the reactors and then stripped with nitrogen, and then reduced with hydrogen for one hour at 510° C. and 200 p.s.i.

A naphtha of 52 RON (clear) is cut into the reactors at a temperature of 510° C. and at a feed rate of 4–7 w./hr./w. The runs are conducted for a period of 16 hours and a material balance is taken over the period. Analysis is made of the product to determine RON (clear) as well as the chlorine and carbon contents of the catalyst. The results are given as tabulated below.

Various other hydrocarbon conversion reactions can be conducted by utilizing, directly or indirectly, the complex metal silicates of this invention. A typical utilization for these catalysts involves alkylation, hydrodealkylation and polymerization reactions. One such utilization is exemplified in an alkylation process wherein high octane blending agents are produced by the reaction and resultant combination of $C_3$, $C_4$ or $C_5$ olefins or mixtures of these olefins with isobutane. It is also feasible, however, for olefins to be added to aromatic ring-containing compounds in an ionic-type reaction mechanism.

Typical of the feedstocks used in the alkylation process are iso-$C_4$–$C_6$ paraffins and gaseous $C_2$–$C_6$ olefins, or aromatic hydrocarbons such as benzene and substituted benzene, e.g., phenols and chlorobenzene, and gaseous and liquid $C_2$–$C_{15}$ olefins. The alkylation process is conducted at temperatures ranging from about 20° C. to about 300° C., preferably at temperatures ranging from about 50° C. to about 100° C., at pressure of atmospheric to about 1000 p.s.i., and preferably from about atmospheric to about 700 p.s.i.

Illustrative of catalysts which are useful in conducting alkylation reactions are magnesium chrysotile flakes, where part of the Mg is replaced by aluminum.

Hydrodealkylation processes can also be conducted using the complex metal silicates of this invention. A typical hydrodealkylation process is exemplified by removal of one or more alkyl groups from alkyl aryls, e.g., alkylbenzenes or alkyl naphthalenes, to produce high-grade benzene or naphthalene as an end product. Benzene is mostly produced from toluene, although the alkylbenzenes can be dealkylated stepwise to yield benzene. Most naphthalene feedstocks contain substantial quantities of alkylbenzenes, indanes, tetrahydronaphthalenes, indenes, biphenyl, and acetnaphthenes. The process is carried out in the presence of hydrogen which is consumed. Typical conditions to produce benzene include from about 540 to about 650° C., from about 500 to about 800 p.s.i., from about 5 to about 10 mol ratio of $H_2$ to feed, and from about 0.25 to about 2.5 w./hr./w. For naphthalene product, typical conditions are from about 540 to about 650° C., from about 600 to about 800 p.s.i., from about 5 to about 15 mol ratio of $H_2$ to feed and from about 0.1 to about 2.5 w./hr./w.

Typical of the catalysts that can be used for hydrodealkylation are magnesium, nickel, and cobalt chrysotile flakes, particularly where part of the cation is substituted by aluminum. These chrysotile bases can be impregnated by metals such as platinum, palladium, cobalt, molybdenum, chromium, nickel, or mixtures thereof.

These catalysts are also suitable for conducting polymerization reactions, typical among which are those wherein low molecular weight gaseous and liquid olefins, including $C_2$–$C_8$ olefins, are polymerized to low molecular weight products boiling in the gasoline range and useful as high octane number gasoline and petrochemical intermediates. The polymerization process is preferably carried out at temperatures ranging from about 0 to about 300° C., and preferably at temperatures ranging from about 20° C. to about 200° C. Pressures generally range from atmospheric to about 3000 p.s.i., and preferably from atmospheric to about 1500 p.s.i. Suitable space velocities range from about 1 v./v./hr. to about 10 v./v./hr., and preferably from about 2 to about 4 v./v./hr.

TABLE XV

| Example No. | 60 | 61 | 62 | 63 | 64 | 65 |
|---|---|---|---|---|---|---|
| Impregnated metal | Pt | Re | Pt | Pt | Pt | Pt. |
| Chloride on catalyst | Low | Low | High | High | High | High. |
| Chrysotile [1] base | 20% Al, 80% Mg | 0.3% Pt, 99.7% Mg | 100% Mg | 0.3% Re, 99.7% Mg | 20% Al, 80% Mg | 10% Cr, 90% Mg. |
| W./hr./w | 4.0 | 6.9 | 4.0 | 4.0 | 4.0 | 4.0. |
| Temp., °C | 510 | 510 | 510 | 510 | 510 | 510. |
| Product octane (RON clear) | 60.4 | 80.0 | 86.0 | 83.0 | 71.0 | 77.0. |
| Relative activity, percent [2] | 22 | 97 | 46 | 41 | 22 | 27. |

[1] All flake material.
[2] 100% relative activity, activity of standard 0.3% Pt on $Al_2O_3$ reforming catalyst (activity corrected for chlorine and carbon on catalyst).

Typical of the catalysts which can be used in polymerization reactions are magnesium chrysotile flakes, when part of the magnesium is replaced by aluminum.

It is also apparent that various modifications and changes can be made in adaptation of these complex metal silicates, and chrysotiles, for use in hydrocarbon conversion reactions within the spirit and scope of this invention.

Among such modifications and changes:

Chrysotiles, e.g., can be treated or modified to improve their catalytic or adsorption properties in much the same manner as other catalytic materials. For example, the metallic cation population can be modified by base exchange, i.e., contact with an ionic solution of the cation to be added to the chrysotile base. It is also known that contact with ammonium salt solutions reduces the alkali metal cations by exchange. In a similar manner the metal cations, including magnesium and aluminum, can be reduced by treatment with acids, the acid form of cation exchange resins, or chelating agents. Conversely, the silica content of synthetic chrysotiles can be reduced by treating with strong caustic solutions, if desired.

Chrysotiles, e.g., can be dispersed in matrices of inorganic oxides such as silica, alumina, combinations thereof or in naturally-occurring materials such as kaolin. The matrix material may be inert chemically or have an activity which is complementary to the activity of the chrysotile. The matrix may serve the additional function of stabilizing the chrysotile component to the environment of the reaction or of a binder to form the chrysotile to the appropriate particle size for the unit operation, for example, fluidizable solids or moving bed or fixed bed reactors.

Chrysotiles, e.g., may be rendered active for adsorption or catalysis by calcination at temperatures below the point which produces substantial modification of the crystal structure, i.e., for many synthetic chrysotile species about 650° C. In addition, chrysotiles can be rendered more active for certain applications by modification in a steam or ammonia atmosphere at elevated temperature. This also renders them more susceptible to modification by subsequent cation exchange.

Chrysotiles, e.g., may be combined with active metals in high surface area form such as palladium, platinum, molybdenum, tungsten, nickel, cobalt and mixtures of these and other metals by exchange with solutions of soluble salts of these and other metals, by precipitation of insoluble salts or hydroxides in the presence of synthetic chrysotiles. This may also be accomplished by adsorption of solutions of these metals either as cations or complex anions followed by decomposition of the complex ion or evaporation of the solvent.

Chrysotiles, e.g., may be regenerated after use as adsorbent or catalyst by stripping off adsorbed materials at high temperature with steam, ammonia, or inert gases. Nonvolatile but combustible residues may be removed by stripping with an oxygen-containing gas which burns away the residue.

These and other modifications will thus be apparent to those skilled in the fuels processing and petrochemical arts.

Having described the invention, what is claimed is:

1. A process for the conversion of hydrocarbons comprising contacting said hydrocarbons at hydrocarbon conversion conditions with a layered complex metal silicate composition characterized as having repeating units defined by the following structural formula:

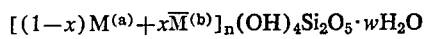

where M and $\overline{M}$ are monovalent and multivalent metal cations selected from Groups I, II, III, IV–B, V–B, VI–B, VII–B and VIII of the Periodic Table of the Elements, having an effective ionic radius ranging from about 0.5 to about 1 A., $x$ is a number ranging from 0 to 1 which expresses the atomic fraction of the metals M and $\overline{M}$, $a$ is the valence of M, $b$ is the valence of $\overline{M}$, $n$ is a number equal in value to that defined by the ratio $$6/[a(1-x)+bx],$$

$w$ is a number ranging from 0 to 4, and the surface area of the composition ranges above 110 m.²/g.

2. The process of claim 1 wherein the effective ionic radius of the metal cations ranges from about 0.57 to about 0.91 A.

3. The process of claim 1 wherein the said composition contains at least two metals.

4. The process of claim 1 wherein the composition is bimetallic.

5. The process of claim 4 wherein the metals are selected from magnesium, nickel, cobalt, chromium, molybdenum, tungsten, palladium, platinum and aluminum.

6. The process of claim 1 wherein the said composition is in the physical form of tubes, characterized as having walls of thickness ranging from about 30 A. to about 50 A., and internal openings of diameter ranging from about 60 A. to about 150 A.

7. The process of claim 6 wherein the surface area of the compositions ranges to about 250 m.²/g.

8. The process of claim 1 wherein the said composition is in the physical form of flakes, of thickness ranging from about 15 A. to about 50 A.

9. The process of claim 1 wherein the surface area of the flakes ranges from about 250 A. to about 600 A., and higher.

10. The process of claim 1 wherein the said silicate composition has an X-ray powder diffraction pattern substantially the same as follows:

| $d$ (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

11. The process of claim 10 wherein the silicate composition is in the physical form of tubes.

12. The process of claim 1 wherein the silicate composition has an X-ray powder diffraction pattern substantially the same as follows:

| $d$ (A.): | I |
|---|---|
| 4.55 | m. |
| 3.22 | w. |
| 2.59 | m. |
| 1.73 | w. |
| 1.54 | m. |
| 1.31 | w. |

13. The process of claim 12 wherein the silicate composition is in the physical form of flakes.

14. A process for the conversion of hydrocarbons comprising contacting said hydrocarbons at hydrocarbon conversion conditions with a layered complex metal silicate composition of surface area ranging above 110 m.²/g., and further characterized as having repeating units defined by the following structural formula:

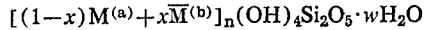

where M and $\overline{M}$ are selected from monovalent and multivalent metal cations of Groups I, II, III, IV–B, V–B, VI–B, VII–B and VIII of the Periodic Table of the Elements, having an effective ionic radius ranging from about 0.5 to about 1.0 A., $x$ is a number which expresses the atomic fraction of M and $\overline{M}$ and ranges from 0.01 to 0.50, $a$ is an expression for the valence of M and $b$ is an expression for the valence of $\overline{M}$ and is an integer ranging from 1 to 7, n is a number ranging from 2.5 to 3.3, and w is a number ranging from 0 to 4.

15. The process of claim 14 wherein x is a number ranging from 0.03 to 0.20 and n is a number ranging from 2.7 to 3.0.

16. The process of claim 14 wherein the effective ionic radius of the metal cations ranges from about 0.57 to about 0.91 A.

17. The process of claim 14 wherein b is an integer ranging from 2 to 4.

18. The process of claim 14 wherein the composition is bimetallic.

19. The process of claim 15 wherein the metals are selected from magnesium, nickel, cobalt, chromium, molybdenum, tungsten, palladium, platinum, and aluminum.

20. The process of claim 15 wherein the said composition is in the physical form of tubes, characterized as having walls of thickness ranging from about 30 A. to about 50 A., and internal openings of diameter ranging from about 60 A. to about 150 A.

21. The process of claim 20 wherein the surface area of the chrysotile is at least about 110 m.²/g.

22. The process of claim 21 wherein the surface area of the compositions ranges to about 250 m.²/g.

23. The process of claim 14 wherein the said composition is in the physical form of flakes, of thickness ranging from about 15 A. to about 50 A.

24. The process of claim 23 wherein the surface area of the flakes ranges from about 250 A. to about 600 A. and higher.

25. The process of claim 14 wherein the said metal silicate composition has an X-ray powder diffraction pattern substantially the same as follows:

| d (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

26. The process of claim 25 wherein the silicate composition is in the physical form of tubes.

27. The process of claim 14 wherein the said silicate composition has an X-ray powder diffraction pattern substantially the same as follows:

| d (A.): | I |
|---|---|
| 4.55 | m. |
| 3.22 | w. |
| 2.59 | m. |
| 1.73 | w. |
| 1.54 | m. |
| 1.31 | w. |

28. The process of claim 27 wherein the silicate composition is in the physical form of flakes.

29. A process for the conversion of hydrocarbons comprising contacting said hydrocarbons at hydrocarbon conversion conditions with a crysotile having a surface area of at least 55 m.²/g.

30. The process of claim 29 wherein the surface area of the chrysotile ranges at least 55 m.²/g. to about 110 m.²/g.

31. The process of claim 30 wherein the surface area of the chrysotile ranges to about 250 m.²/g.

32. The process of claim 29 wherein the said chrysotile is in the physical form of tubes, characterized as having walls of thickness ranging from about 30 A. to about 50 A., and internal openings of diameter ranging from about 60 A. to about 150 A.

33. The process of claim 29 wherein the said chrysotile composition has an X-ray powder diffraction pattern substantially the same as follows:

| d (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

34. The process of claim 29 wherein the chrysotile composition is in the physical form of tubes.

35. The process of claim 29 wherein the said composition is in the physical form of flakes, of thickness ranging from about 15 A. to about 50 A.

36. The process of claim 35 wherein the surface area of the flakes ranges from about 250 A. to about 600 A. and higher.

37. The process of claim 29 wherein the chrysotile composition has an X-ray powder diffraction pattern substantially the same as follows:

| d (A.): | I |
|---|---|
| 4.55 | m. |
| 3.22 | w. |
| 2.59 | m. |
| 1.73 | w. |
| 1.54 | m. |
| 1.31 | w. |

38. The process of claim 37 wherein the chrysotile composition is in the physical form of flakes.

39. A process for the conversion of hydrocarbons comprising contacting said hydrocarbons at hydrocarbon conversion conditions with a chrysotile having a surface area of at least 55 m.²/g., said chrysotile having been prepared from an aqueous reaction mixture containing silica, and a metal cation selected from Groups I, II, III, IV-B, V-B, VI-B, VIII-B and VIII of the Periodic Table of the Elements, having an effective ionic radius ranging from about 0.5 to about 1.0 A.

40. The process of claim 39 wherein the effective ionic radius of the metal cations ranges from about 0.57 to about 0.91 A.

41. The process of claim 40 wherein the said chrysotile contains at least two metals.

42. The process of claim 39 wherein the chrysotile is bimetallic.

43. The process of claim 42 wherein the metals are selected from magnesium, nickel, cobalt, chromium, molybdenum, tungsten, palladium, platinum and aluminum.

44. The process of claim 39 wherein the said chrysotile is in the physical form of tubes, characterized as having walls of thickness ranging from about 30 A. to about 50 A., and internal openings of diameter ranging from about 60 A. to about 150 A.

45. The process of claim 39 wherein the said metal chrysotile composition has an X-ray powder diffraction pattern substantially the same as follows:

| d (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

46. The process of claim 45 wherein the chrysotile composition is in the physical form of tubes.

47. The process of claim 46 wherein the surface area of the chrysotile ranges at least 55 m.²/g. to about 110 m.²/g.

48. The process of claim 46 wherein the surface area of the chrysotile ranges to about 250 m.²/g.

49. The process of claim 39 wherein the said composition is in the physical form of flakes, of thickness ranging from about 15 A. to about 50 A.

50. The process of claim 49 wherein the surface area of the flakes ranges from about 250 A. to about 600 A. and higher.

51. The process of claim 39 wherein the chrysotile composition has an X-ray powder diffraction pattern substantially the same as follows:

| $d$ (A.): | I |
|---|---|
| 4.55 | m. |
| 3.22 | w. |
| 2.59 | m. |
| 1.73 | w. |
| 1.54 | m. |
| 1.31 | w. |

52. The process of claim 49 wherein the chrysotile composition is in the physical form of flakes.

53. The process of claim 1 wherein the surface area of the composition ranges above 110 m.²/g., except
where $x=0$, and M is nickel, the surface area of the composition ranges above about 125 m.²/g., and
where $x=0$, and M is cobalt, the surface area of the composition ranges above about 190 m.²/g.

54. A process for the hydrocracking of hydrocarbons to make naphtha and jet fuel comprising contacting said hydrocarbons, in the presence of hydrogen, at temperatures ranging from about 250° C. to about 450° C., at pressures ranging from about 400 to about 3000 p.s.i., with a catalyst composite comprising chrysotile having a surface area of at least 55 m.²/g., and a metallic hydrogenation component.

55. The process of claim 54 wherein the reaction is conducted at temperatures ranging from about 350° C. to about 425° C., and at pressures ranging from about 500 to about 2500 p.s.i.

56. The process of claim 54 wherein the hydrogenation component is selected from a group consisting of VI-B, VII-B, and VIII metals, of the Periodic Table of the Elements, and mixtures thereof.

57. The process of claim 54 wherein the metal hydrogenation component is selected from platinum, palladium, tungsten, nickel, cobalt and the like.

58. The process of claim 54 wherein the catalyst composites are mixed metal chrysotiles selected from the group consisting of magnesium aluminum chrysotile impregnated with a metal selected from palladium and platinum, and mixtures of palladium and platinum; a magnesium-nickel chrysotile impregnated with a metal selected from moylbdenum and tungsten; magnesium-tungsten chrysotile impregnated with a metal selected from the group consisting of nickel and cobalt, and mixtures of nickel and cobalt; magnesium-molybdenum chrysotile impregnated with a metal selected from the group consisting of nickel, cobalt, and mixtures of nickel and cobalt; nickel-tungsten chrysotile and cobalt-molybdenum chrysotile.

59. The process of claim 58 wherein the catalyst composites are employed in the presence of a compound selected from the group consisting essentially of organic sulfur, organic nitrogen, and mixtures thereof.

60. The process of claim 58 wherein the catalyst composites are employed in a sweet hydrocracking operation.

61. The process of claim 54 wherein the surface area of the chrysotile ranges from at least 55 m.²/g. to at least 110 m.²/g.

62. The process of claim 54 wherein the surface area of the chrysotile ranges from about 110 m.²/g. to about 250 m.²/g.

63. The process of claim 54 wherein the said chrysotile is in the physical form of tubes, characterized as having walls of thickness ranging from about 30 A. to about 50 A., and internal openings of diameter ranging from about 60 A. to about 150 A.

64. The process of claim 63 wherein the surface area of the compositions ranges to about 250 m.²/g.

65. The process of claim 54 wherein the said composition is in the physical form of flakes, of thickness ranging from about 15 A. to about 50 A.

66. The process of claim 54 wherein the surface area of the flakes ranges from about 250 A. to about 600 A. and higher.

67. The process of claim 54 wherein the said chrysotile has an X-ray powder diffraction pattern substantially the same as follows:

| $d$ (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

68. The process of claim 67 wherein the chrysotile is in the physical form of tubes:

69. The process of claim 54 wherein the chrysotile has an X-ray powder diffraction pattern substantially the same as follows:

| $d$ (A.): | I |
|---|---|
| 4.55 | m. |
| 3.22 | w. |
| 2.59 | m. |
| 1.73 | w. |
| 1.54 | m. |
| 1.31 | w. |

70. The process of claim 69 wherein the chrysotile is in the physical form of flakes.

71. A process for the hydrocracking of hydrocarbons to make mid-distillates comprising contacting said hydrocarbons, in the presence of hydrogen, at temperatures ranging from about 370° C. to about 450° C., at pressures ranging from about 100 to about 3000 p.s.i., with a catalyst composite comprising chrysotile having a surface area of at least 55 m.²/g., and a metallic hydrogenation component in the presence of organic sulfur and organic nitrogen.

72. The process of claim 71 wherein the chrysotile base is of acidity ranging from about 0.2 to about 0.9, as measured by pyridine adsorption.

73. The process of claim 71 wherein the surface area of the chrysotile ranges from at least 55 m.²/g. to at least about 110 m.²/g.

74. The process of claim 71 wherein the surface area of the chrysotile ranges from about 110 m.²/g. to about 250 m.²/g.

75. The process of claim 71 wherein the said chrysotile is in the physical form of tubes, characterized as having walls of thickness ranging from about 30 A. to about 50 A., and internal openings of diameter ranging from about 60 A. to about 150 A.

76. The process of claim 75 wherein the surface area of the chrysotile ranges to about 250 m.²/g.

77. The process of claim 71 wherein the said chrysotile composition is in the physical form of flakes, of thickness ranging from about 15 A. to about 50 A.

78. The process of claim 71 wherein the surface area of the flakes ranges from about 250 A. to about 600 A., and higher.

79. The process of claim 71 wherein the said chrysotile composition has an X-ray powder diffraction pattern substantially the same as follows:

| $d$ (A.): | I |
|---|---|
| 7.50 | s. |
| 4.50 | m. |
| 3.67 | s. |
| 2.58 | m. |
| 2.46 | m. |
| 2.10 | w. |
| 1.725 | w. |
| 1.545 | m. |
| 1.320 | w. |
| 1.300 | w. |

80. The process of claim 79 wherein the chrysotile composition is in the physical form of tubes.

81. The process of claim 71 wherein the chrysotile composition has an X-ray powder diffraction pattern substantially the same as follows:

| $d$ (A.): | I |
|---|---|
| 4.55 | m. |
| 3.22 | w. |
| 2.59 | m. |
| 1.73 | w. |
| 1.54 | m. |
| 1.31 | w. |

82. The process of claim 81 wherein the chrysotile composition is in the form of flakes.

83. The process of claim 71 wherein the chrysotile is magnesium chrysotile or nickel chrysotile.

84. The process of claim 83 wherein the chrysotile is magnesium chrysotile, and from about 10 to about 35 mole percent of the magnesium is substituted by aluminum.

85. The process of claim 71 wherein the metallic hydrogenation component is selected from Groups VI–B, VII–B and VIII metals.

86. The process of claim 85 wherein the metal hydrogenation component is selected from cobalt, molybdenum and mixtures thereof.

References Cited
UNITED STATES PATENTS

| 1,681,238 | 8/1928 | James | 252—451 |
| 1,698,009 | 1/1929 | Weber | 208—143 X |
| 1,890,434 | 12/1932 | Krauch et al. | 208—10 |

DELBERT E. GANTZ, Primary Examiner

G. E. SCHMITKONS, Assistant Examiner

U.S. Cl. X.R.

208—111, 118, 134, 143; 252—449, 454; 260—673.5

UNITED STATES PATENT OFFICE
CERTIFICATE OF CORRECTION

Patent No. 3,804,741                 Dated April 16, 1974

Inventor(s) Harry E. Robson

It is certified that error appears in the above-identified patent and that said Letters Patent are hereby corrected as shown below:

Column 1, lines 6 and 7, after "assignor to" delete "Velsicol Chemical Corporation, Chicago, Illinois" and insert correct assignee, -- Esso Research and Engineering Company, a corporation of Delaware -- .

Signed and sealed this 1st day of October 1974.

(SEAL)
Attest:

McCOY M. GIBSON JR.                C. MARSHALL DANN
Attesting Officer                  Commissioner of Patents